United States Patent [19]
Jayaraman et al.

[11] Patent Number: 5,751,115
[45] Date of Patent: May 12, 1998

[54] LAMP CONTROLLER WITH LAMP STATUS DETECTION AND SAFETY CIRCUITRY

[75] Inventors: Raj Jayaraman, Rancho Palos Verdes; Yongping Xia; Sreeraman Venkitasubrahmanian, both of Torrance, all of Calif.; Paul Leyton, Son, Netherlands

[73] Assignee: Philips Electronics North America Corporation, New York, N.Y.

[21] Appl. No.: 759,350

[22] Filed: Dec. 3, 1996

Related U.S. Application Data

[63] Continuation of Ser. No. 415,020, Mar. 31, 1995, Pat. No. 5,650,694.
[51] Int. Cl.$^6$ ................................................ H05B 41/14
[52] U.S. Cl. ............... 315/225; 315/119; 315/DIG. 5; 315/277; 307/157; 363/50; 363/56
[58] Field of Search ..................... 315/225, 119, 315/307, DIG. 5, 107, 106, 277; 363/49, 50, 56; 307/157

[56] References Cited

U.S. PATENT DOCUMENTS

| | | | |
|---|---|---|---|
| 4,667,131 | 5/1987 | Nilssen | 315/275 |
| 5,293,099 | 3/1994 | Bobel | 315/225 |
| 5,436,529 | 7/1995 | Bobel | 315/127 |
| 5,650,694 | 7/1997 | Jayaraman et al. | 315/225 |

*Primary Examiner*—Robert Pascal
*Assistant Examiner*—Arnold Kinkead
*Attorney, Agent, or Firm*—Edward Blocker

[57] ABSTRACT

A ballast includes safety circuitry which senses lamp status through various phases of ballast operation. According to one feature, the ballast is prevented from supplying an output voltage upon initial energization of the ballast when a lamp is not present at the output terminals. The presence of a filament is sensed via a DC path extending through the filament heater windings of an output transformer. When the DC path is not complete, a control input, for example the power supply input of the ballast controller, is not provided with a voltage to start ballast operation. The DC path is also used to restart the ballast if a defective lamp is replaced with a good one. Over-voltage and capacitive mode detection is also disclosed to shut down ballast output upon lamp failure/removal.

3 Claims, 17 Drawing Sheets

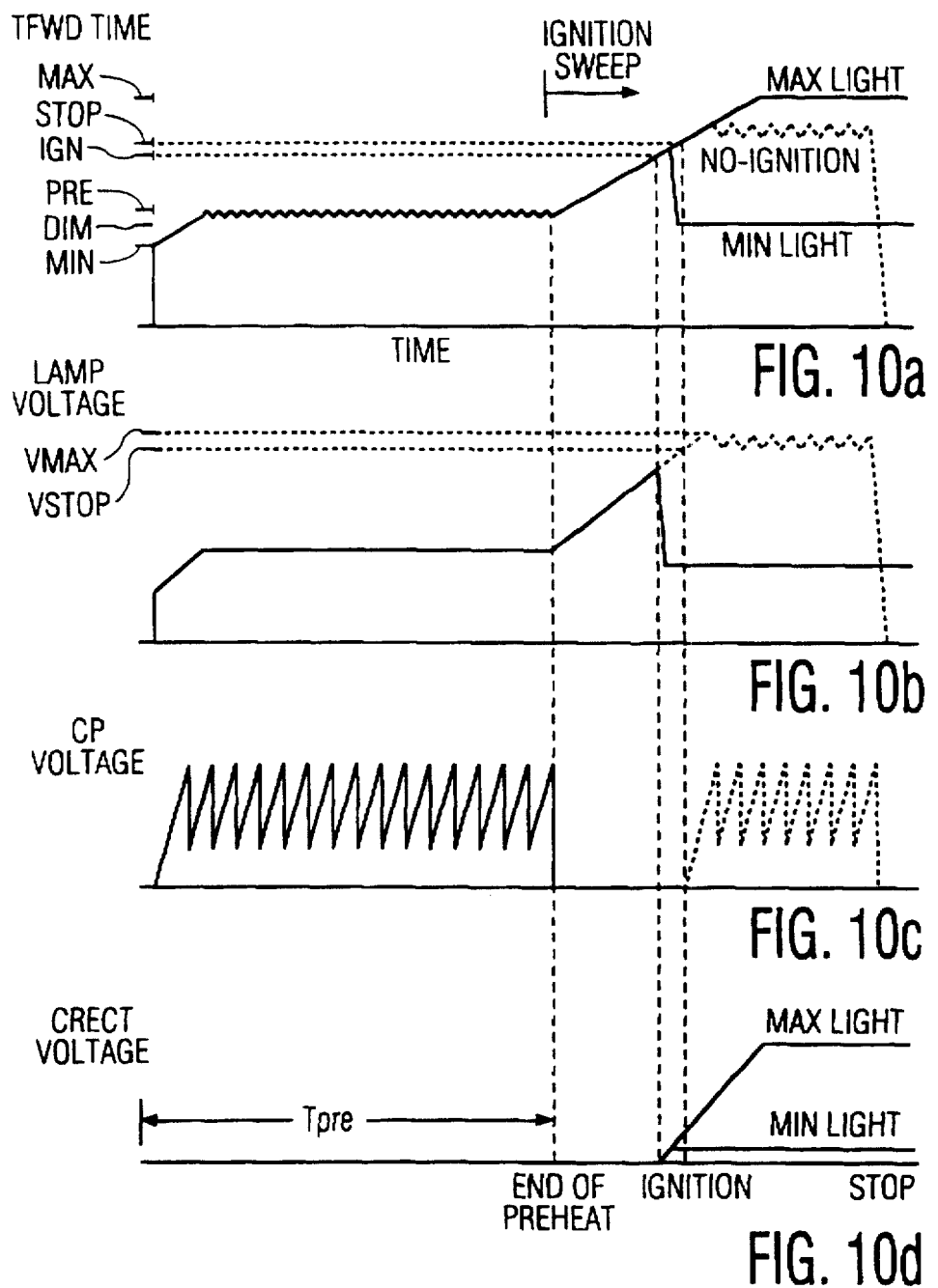

LAMP CONTROLLER WITH LAMP STATUS DETECTION AND SAFETY CIRCUITRY

This is a continuation of application Ser. No. 08/415,020, filed on Mar. 31, 1995 now U.S. Pat. No. 5,650,694.

BACKGROUND OF THE INVENTION

1. Field of the Invention.

The invention relates generally to lamp controllers for controlling lamps having filament electrodes, such as low pressure mercury vapor fluorescent lamps. More particularly, the invention concerns circuitry in such a lamp controller which detects lamp status to implement various safety features.

2. Description of the Prior Art.

Low pressure mercury vapor fluorescent lamps exhibit negative resistance characteristics, that is lamp resistance decreases after ignition. A lamp controller or ballast provides a high starting voltage between the lamp electrodes and controls the lamp operating current after starting. In rapid start systems, the lamp electrodes are filaments and filament current is provided to heat the filaments, which lowers the voltage required for lamp starting.

It is common for ballasts to control two or more lamps. A disadvantage of many known ballast designs is that if a filament electrode of one of the lamps fails, or if a lamp is removed from its socket, the ballast will sense that a lamp has extinguished and will attempt to reignite the failed or removed lamp. This is accomplished in some ballasts by applying a high starting voltage across all of the lamps for a short period, and repeating until the ballast senses that all lamps are lit. This starting cycle results in a very undesirable flashing of the remaining working lamp(s). This flashing causes a decrease in lamp life because it stresses the filament electrodes unnecessarily. It also presents a shock hazard in that high voltages are present at the lamp socket contacts. The shock hazard relative to ground can be substantially avoided with an isolation transformer, but a shock hazard across the socket contacts at the opposite end of a lamp or set of lamps would still exist.

U.S. Pat. No. 4,382,212 (Bay) discloses an electronic ballast having a push-pull inverter and which includes a shut down circuit for detecting the removal of at least one lamp filament from its respective socket, or failure of a filament, and for stopping the operation of the high frequency inverter in such event. The shut down device includes a pair of feedback windings each to provide a feedback signal from a lamp filament current and a differential transformer having a first winding coupled to one feedback winding and a second winding coupled to the other feedback winding. During normal operation, the flux in the core of the differential transformer due to the current in the first and second windings will cancel each other. When one of the filaments burns out or is removed, the flux cancellation will be upset. The resulting impedance of the differential transformer is used to shut down oscillation of the high frequency inverter through a feed-back winding input of the push-pull circuit. A disadvantage of this arrangement is that it requires a differential transformer in addition to the primary transformer, and hence increases circuit cost.

U.S. Pat. No. 4,952,849 (Fellows et al) discloses a ballast having an inverter coupled to the load by a resonant output circuit. The output circuit produces an ignition voltage at an inverter frequency offset in one direction from its resonant frequency. Upon energization of the ballast, the lamp filaments are first preheated with high frequency currents to aid ignition and the controller then sweeps the inverter frequency from a high level above that at which ignition could occur to a lower level at which the ignition voltage is produced. After ignition, stable operation is achieved in a frequency range well above the resonant point of the output circuit. During the preheat and ignition phases of operation, a lamp voltage regulator circuit limits the maximum open circuit voltage across the lamps. If the lamp does not ignite after a preselected number of attempts or if a lamp fails, the lamp voltage regulator circuit initiates a re-ignition operation in which the operating frequency is rapidly switched to its maximum value and then gradually reduced to increase the operating voltage, to thereby make another attempt at lamp ignition. However, this has the adverse affect discussed above of continuously "flashing" the remaining lamp, as well as providing a high ignition voltage at the lamp socket even if a lamp is not present. The ballast also provides an output voltage upon initial energization of the ballast even if no lamps are present.

U.S. Pat. No. 5,089,753 (Mattas) discloses a form of protection circuitry for the ballast of the Fellows '849 patent. The protection circuit includes a bridge arrangement which senses the current flow through each of two lamps in a two lamp system and limits the number of ignition attempts in the event that one of the lamps ignites and the other doesn't. This limits the duration of the flicker effect caused by only one lamp being lit during repeated ignition attempts. If one of the lamps does not ignite, a capacitor is charged so that after a selected number of ignition attempts the voltage on this capacitor associated with a START control input is sufficient to cause the controller to be placed into a pre-ignition mode in which the inverter frequency is kept at a high level and prevented from sweeping to a low level to produce the ignition voltage. While limiting the number of ignition attempts, the inverter of this circuit will oscillate and provide an output voltage upon initial energization of the ballast despite the absence of lamps at the lamp terminals. The protection circuit also includes a DC trickle path through a respective filament of each lamp to detect when a lamp which has failed to ignite is replaced. When a lamp is replaced, the trickle path is broken, causing via a set of switches, the capacitor associated with the START input to discharge. This enables the controller to reenter the ignition mode in which the high ignition voltage is produced across the lamps.

U.S. Pat. No. 4,461,980 (Nilssen) discloses a protection circuit in a ballast which disables the inverter within a brief time period of about one second after a lamp is removed from its socket. The protection circuit disables the inverter when the lamp current falls below a prescribed minimum. The circuit includes a thermally responsive bimetal switch which shorts an inverter feedback loop. When lamp current is not flowing, a clamping current flows through a heating filament of the bimetallic switch. In this arrangement, no lamp current flows during the pre-heat and ignition phases, so the bimetallic switch is selected so that it enables a normally functioning lamp to be ignited. This means, however, that upon initial energization of the ballast the inverter is powered-up and the high output voltage appears across the lamp terminals whether a lamp is present or not.

Accordingly, it is the object of the invention to provide a lamp controller with improved lamp status detection and safety circuitry.

SUMMARY OF THE INVENTION

Generally speaking, according to one aspect of the invention, a gas discharge lamp ballast includes safety circuitry which prevents an output voltage if a lamp is not present when the ballast is initially energized. The ballast includes inputs for receiving a source of electrical energy, such as a mains power supply, to power the ballast. A ballasting stage controls the electrical power supplied to the gas discharge lamp and includes a first pair of output terminals for connection to a pair of lamp contacts of the gas discharge lamp between which a filament extends. A detection circuit verifies the presence of a conductive path extending between the terminals of the first pair of output terminals upon initial application of electrical energy to the ballast inputs. The detection circuit is coupled to the ballasting stage so that the ballast stage does not energize the gas discharge lamp and provides no electrical potential at the output terminals if no conductive path exists between the first pair of output terminals, such as in the case of a missing lamp or a failed filament. This is in contrast to the known ballasts in which the ballast stage provides an output voltage upon initial energization of the ballast even without lamps being present.

In a favorable embodiment, the ballast stage includes an inverter which oscillates to energize the gas discharge lamp, and the safety circuit prevents the inverter from oscillating in the absence of the conductive path between the first pair of output terminals.

According to a further aspect, the detection circuit includes a DC voltage source providing a DC potential across the terminals of the first pair of output terminals. The ballasting stage includes a control circuit for the inverter with a control input which prevents the inverter from oscillating in the absence of a predetermined control signal. The predetermined control signal is applied to the control input only when a DC current flows from the DC voltage source through the conductive filament path between the first pair of output terminals. If the conductive path is not present, the inverter does not commence oscillation.

According to another aspect, the safety circuit includes a first switch which in a first switch state connects the control input to the control signal and a second switch state which disconnects the control input from the control signal. The switch includes a control terminal which keeps the switch in the second switch state, and prevents the control signal from being applied to the control input, unless the DC potential is received at the control terminal via a conductive path between the first pair of output terminals. Favorably, the control input is the power supply input for the control circuit and the first switch state connects a power supply voltage to this input in the first switch state.

According to another feature, the safety circuit further detects when a lamp has been removed or has failed after the ballast stage commences operation. The inverter is shut-off in a simple manner through a second switch which serves to pull down the voltage at the power supply input of the inverter controller and shuts-off the inverter. In one embodiment, the lamp removal/failure is accomplished by sensing when the open circuit voltage exceeds a predetermined level. In another embodiment, a capacitive mode of operation of the inverter, resulting from the lamp removal/failure, is sensed.

Still another favorable feature of the invention ensures, via the DC potential of the detection circuitry, that power is supplied to the power-supply input of the inverter controller when a failed lamp is replaced with a good lamp to thereby automatically restart ballast operation.

According to a favorable embodiment, the ballast stage includes output terminals for operating two low pressure mercury vapor fluorescent lamps, each having a respective filament electrode at opposite ends of the lamp. An output transformer includes (i) a first filament heating winding for providing filament heating current via the first pair of output terminals to a first filament of the first lamp, (ii) a third filament heating winding for providing filament heating current to a first filament of the second lamp via a third pair of output terminals, and (iii) a second filament heating winding for providing heating current to the second filament of each of the first and second lamps via a second pair of output terminals. The detection means detects the presence of the lamps by sensing a conductive path through the first filament of both lamps. The inverter is prevented from oscillating if either lamp is missing or has a failed first filament upon initial turn-on. In comparison the rather complex bridge and switch arrangement of Mattas ('753), particularly simple circuit is achieved by using the first and third filament windings and a secondary winding of the output transformer for the DC current path.

According to yet another aspect of the invention, the ballast includes a power supply stage connected between an input rectifier and the inverter to provide a relatively high DC voltage to the inverter. The power supply is in the form of a switched-mode power supply and includes a control circuit having a power supply input. Power is applied to the power supply input of the power supply circuit through an output of the inverter. This has the advantage that when the ballast is energized, the power supply control circuit is disabled until the inverter begins oscillating, which doesn't occur in the absence of a lamp.

In still further aspect of the invention, the control circuit for the inverter includes an integrated circuit having further circuitry for detecting when a lamp has been removed after the lamp has already been ignited and has been operating. One form of detection circuitry detects when the inverter has entered a capacitive mode of operation, which results when an operating lamp is removed. An open circuit voltage limiting circuit is then activated which, when the open circuit voltage exceeds a predetermined level, causes the controller to enter a stand by state where inverter oscillation is stopped. This forms a primary safety feature along with an output isolation transformer, with the stop functions of the safety circuit providing back-up safety when a lamp is removed after the ballast has begun operating.

These and other objects, features and advantages of the invention will become apparent with reference to the accompanying drawing and the following detailed description and claims.

BRIEF DESCRIPTION OF THE DRAWINGS

FIG. 2(a) shows circuit A, B and C; FIG. 2(b) shows circuits D and E; and FIG. 2(c) shows circuit I;

FIGS. 10(a)-10(d) illustrate waveforms for the pre-heat and ignition sequence;

FIG. 5(b) illustrates the same waveforms with misfiring prevented by the invention;

DETAILED DESCRIPTION OF THE PREFERRED EMBODIMENTS

Figure 1:
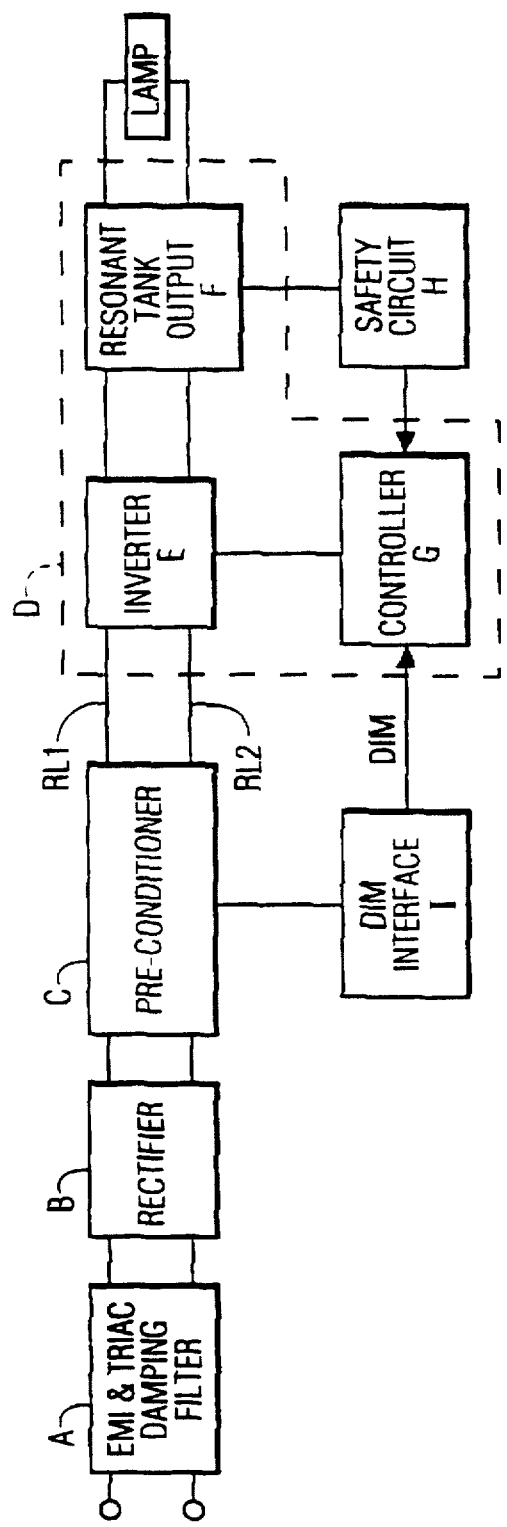
FIG. 1 is a block diagram of the ballast according to the invention.

The fluorescent lamp controller shown in FIG. 1 includes an EMI and triac damping filter "A" connected to full bridge input rectifier "B", which together convert an AC power line voltage into a rectified, filtered DC voltage at an output thereof. The pre-conditioner circuit "C" includes circuitry for active power factor correction, as well as for increasing and controlling the DC voltage from the rectifier circuit B, which DC voltage is provided across a pair of DC rails RL1, RL2. Circuit "D" is a ballast circuit for controlling operation of the lamp and includes a DC-AC converter, or inverter, "E", resonant tank output circuit "F" and controller "G" which controls the inverter. The inverter E is a half-bridge configuration which under control of the half-bridge controller, or driver, circuit G provides a high frequency substantially square wave output voltage to the output circuit F. The resonant tank output circuit F converts the substantially square wave output of the half-bridge into a sinusoidal lamp current.

The safety circuit "H" provides a back-up stop function which prevents an output voltage from being present at the lamp terminals when one or both of the fluorescent lamps has failed or has been removed from its socket. The safety circuit also restarts the controller G when its senses that both filament electrodes in each lamp are good.

A dimming interface circuit "I" is connected between an output of the rectifier circuit B and a control input of ballast circuit present at the controller G to control dimming of the lamp. The dimming interface circuitry provides a dimming voltage signal to the controller G which is proportional to the setting of the phase angle dimmer.

CIRCUITS A;B: EMI and Triac Damping Filter; Full Bridge Rectifier

Figure 2A:
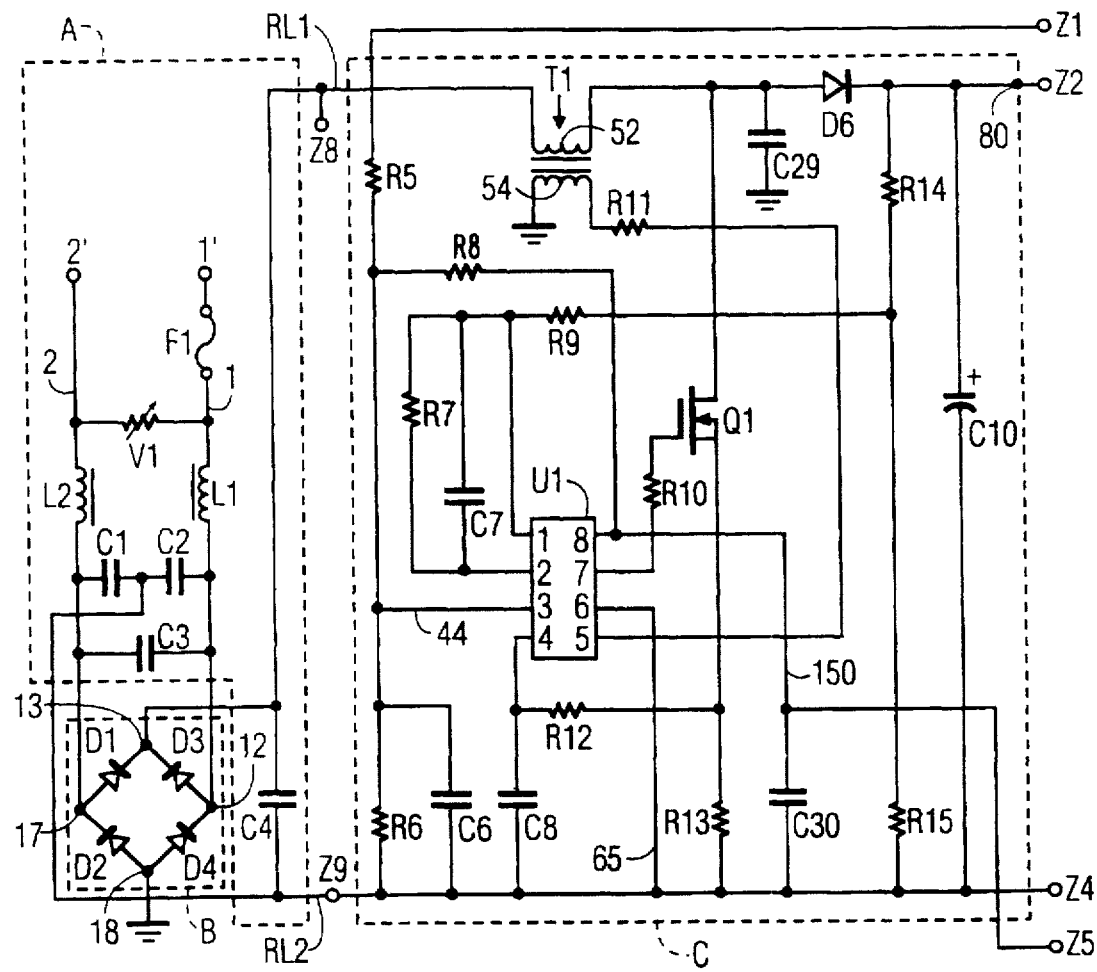
FIGS. 2(a)–2(c) show the detailed circuit diagram of the ballast of FIG. 1.

Filter Circuit A (FIG. 2(a)) includes a pair of input terminals 1',2' for receiving an ordinary alternating current power line voltage, for example, of 120 volts AC. First and second choke coils L1,L2 each have a first end connected to a respective terminal 1',2' and a second end connected to a respective input node 12,17 of the full bridge rectifier B, consisting of diodes D1-D4, via input lines 1,2. A fuse F1 is in series between the choke coil L1 and input terminal 1'. A transient-surge-suppressing metal oxide varistor V1 bridges the lines 1,2. The varistor conducts little at line voltage but conducts readily at higher voltages to protect the ballast from high transient surge voltages. The rectifier provides a full wave rectified output voltage on a pair of DC rails RL1, RL2 via nodes 13, 18, respectively. The cathode of diode D2 and the anode of diode D1 are connected to line 2 at node 17 and the cathode of diode D4 and the anode of diode D3 are connected to line 1 at node 12. The anodes of diodes D2 and D4 are connected to DC rail RL2 at node 18 and the cathodes of diodes D1 and D3 are connected to the DC rail RL1 at node 13. For a 120 V, 60 Hz AC input at terminals 1',2' the bridge rectifier outputs a pulsed 120 Hz DC, 170 V peak across rails RL1, RL2. The output of the bridge rectifier may also carry phase control information from an external phase control dimmer, to be further discussed.

Series capacitors C1 and C2, having their midpoint connected to ground, each have a relatively small capacitance and form a common mode filter which prevents very high frequency components from the ballast from entering the power line. The chokes L1, L2 and the capacitors C3, C4 form an EMI filter which has a low impedance at line frequencies and a high impedance at the much higher ballast operating frequency to reduce conduction of EMI back into the power lines. The operation of the EMI filter will be discussed in greater detail along with the interface and pre-conditioner circuits.

CIRCUIT C: Pre-Conditioner

Figure 3:
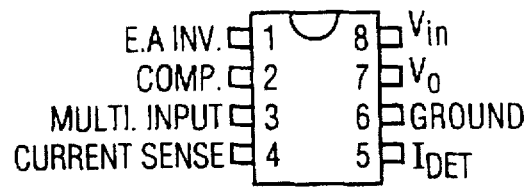
FIG. 3 illustrates the terminal pin arrangement for the IC U1 of the pre-conditioner circuit C.

The pre-conditioner circuit C (FIG. 2(a)) includes the primary components of an integrated circuit ("IC") control chip U1, in this instance a Linfinity LX1563, a boost inductor in the form of a transformer T1, a storage capacitor C10 and a boost switch Q1, which together form a switched mode power supply ("SMPS"). The controller U1 controls the switching of switch Q1 to (i) control the power factor of the current drawn from the power lines and (ii) increase the DC voltage across the capacitor C10, and rails RL1, RL2, to about 300 V DC. The pin connections for the IC U1, referred to below, are shown in FIG. 3.

Boost inductor T1 includes a primary coil 52 having one end connected to node 13 and another end connected to the anode of a diode D6. The cathode of the diode D6 is connected to an output 80 of the pre-conditioner circuit C. The anode of diode D6 is also connected to the drain of the mosfet switch Q1, the gate of which is connected to ground via a resistor R13. The control gate of switch Q1 is connected to the "OUT" pin (pin 7) of the IC U1 via a resistor R10. The OUT pin provides a pulse width modulated signal at the control gate of the boost switch to control the switching thereof. The multiplier input "MULT_IN" pin (pin 3) is connected to a node between the resistors R5 and R6 and senses the full wave rectified AC voltage on rail RL1, scaled by the voltage divider formed by the resistors R5, R6. The scaled voltage is one input of a multiplier stage within IC U1. The other input of the multiplier stage is internal and is the difference of an internal error amplifier output and an internal reference voltage. The output of the multiplier stage controls the peak inductor current in the primary of transformer T1 by influencing the timing of the switching of switch Q1. A capacitor C6 is in parallel with the resistor R6 and serves as a noise filter.

The "V$_{IN}$" pin (pin 8) receives the input supply voltage for the IC U1 from the output of the inverter circuit E via line 150. Since the output of the inverter is at high frequency, the bypass capacitor C30 provides a stable voltage supply. The "V$_{in}$" pin is also connected to a node between the resistors R5 and R6 via the resistor R8. This provides a small offset voltage to the MULT IN pin, which will be discussed in greater detail with reference to the EMI input filter. The secondary winding 54 of the booster choke T1 has one end connected to ground and its other end connected to the I$_{DET}$ pin (pin 5) via a resistor R11. The I$_{DET}$ pin senses the flyback voltage on the secondary winding 54 associated with the zero crossing of the inductor current through the primary winding 52. The GND pin (pin 6)is connected to ground via line 65 and rail RL2. The C.S. pin (pin 4) senses the current through the boost switch Q1 by sensing the voltage drop across the resistor R13 through the resistor R12. A filter capacitor C8, tied between the rail RL2 and the C.S. pin, filters any voltage spikes which occur may upon the switching of the switch Q1 from its non-conductive to its conductive state due to the drain-to-source capacitance of mosfet Q1. A second voltage divider including the resistors R14 and R15 is connected between the rails RL1 and RL2. The "INV" pin (pin 1) is connected to a node between the resistors R14 and R15 via a resistor R9 and senses the output voltage of the preconditioner stage. The "COMP" pin (pin 2) is connected to the output of the internal error amplifier within IC U4. A feedback compensation network consisting of a resistor R7 and a capacitor C7 connects the COMP pin to the INV pin, thereby providing internal feedback and further control of the switch Q1.

The full-wave rectified positive DC voltage from the output 13 of the input rectifier, which may also carry phase control information from a remote dimming controller, enters the pre-conditioner circuit on rail RL1 to the voltage divider of resistors R5, R6 and to the booster choke T1. The DC component divides at lead 44 establishing a reference voltage to the multiplier input MULT_IN pin.

When the switch Q1 conducts, the resulting current through the primary winding 52 of transformer T1 and switch Q1 causes a voltage drop across the resistor R13 that is effectively applied through the resistor R12 to input C.S. This voltage at pin C.S. represents the peak inductor current and is compared with the voltage output by the internal multiplier stage, which multiplier output voltage is proportional to the product of the rectified AC line voltage and the output of the error amplifier internal to IC U1. When the peak inductor current sensed at pin C.S. exceeds the multiplier output voltage, the switch Q1 is turned off and stops conducting. The energy stored in the primary winding 52 is now transferred and stored in the boost capacitor C10, causing the current through the primary winding 52 to ramp down. When the primary winding 52 runs out of energy, the current through winding 52 reaches zero and the boost diode D6 stops conducting. At this point, the drain to source capacitance of the mosfet switch Q1 in combination with the primary winding 52 forms an LC tank circuit which causes the drain voltage on mosfet Q1 to resonate. This resonating voltage is sensed by the I$_{DET}$ pin through the secondary winding 54. When the resonating voltage swings negative, the IC U1 turns the switch Q1 ON, rendering it conductive. This conduction, non-conduction of switch Q1 occurs for the entire cycle of the rectified input and at a high frequency on the order of hundreds of times the frequency of the AC voltage entering the input rectifier. The inductor current through winding 52 has a high frequency content which is filtered by the input capacitor C4, resulting in a sine wave input current in phase with the AC line voltage. Essentially, the pre-conditioner stage makes the ballast look resistive to the power lines to maintain a high power factor.

For a 120 V AC input, without phase cutting, the voltage at output 80, the positive side of buffer capacitor C10, is on the order of 300 V DC with a small alternating DC component present. It is this voltage which is supplied to the ballast stage D, and in particular, to the inverter E. Output voltage regulation is accomplished by the sensing of the scaled output voltage, from the divider formed by the resistors R14, R15, by the internal error amplifier at the INV pin. The internal error amplifier compares the scaled output voltage to an internal reference voltage, and generates an error voltage. This error voltage controls the amplitude of the multiplier output, which adjusts the peak inductor current in winding 52 to be proportional to load and line variations, thereby maintaining a well regulated output voltage for the inverter circuit E.

Additional information about the LX1563 IC is available from Linfinity, Inc. of Garden Grove, Calif. 92641. It should be noted that other power factor control IC's are commercially available which provide substantially similar power factor control and voltage supply functions.

Circuit E: Inverter

Figure 2B:
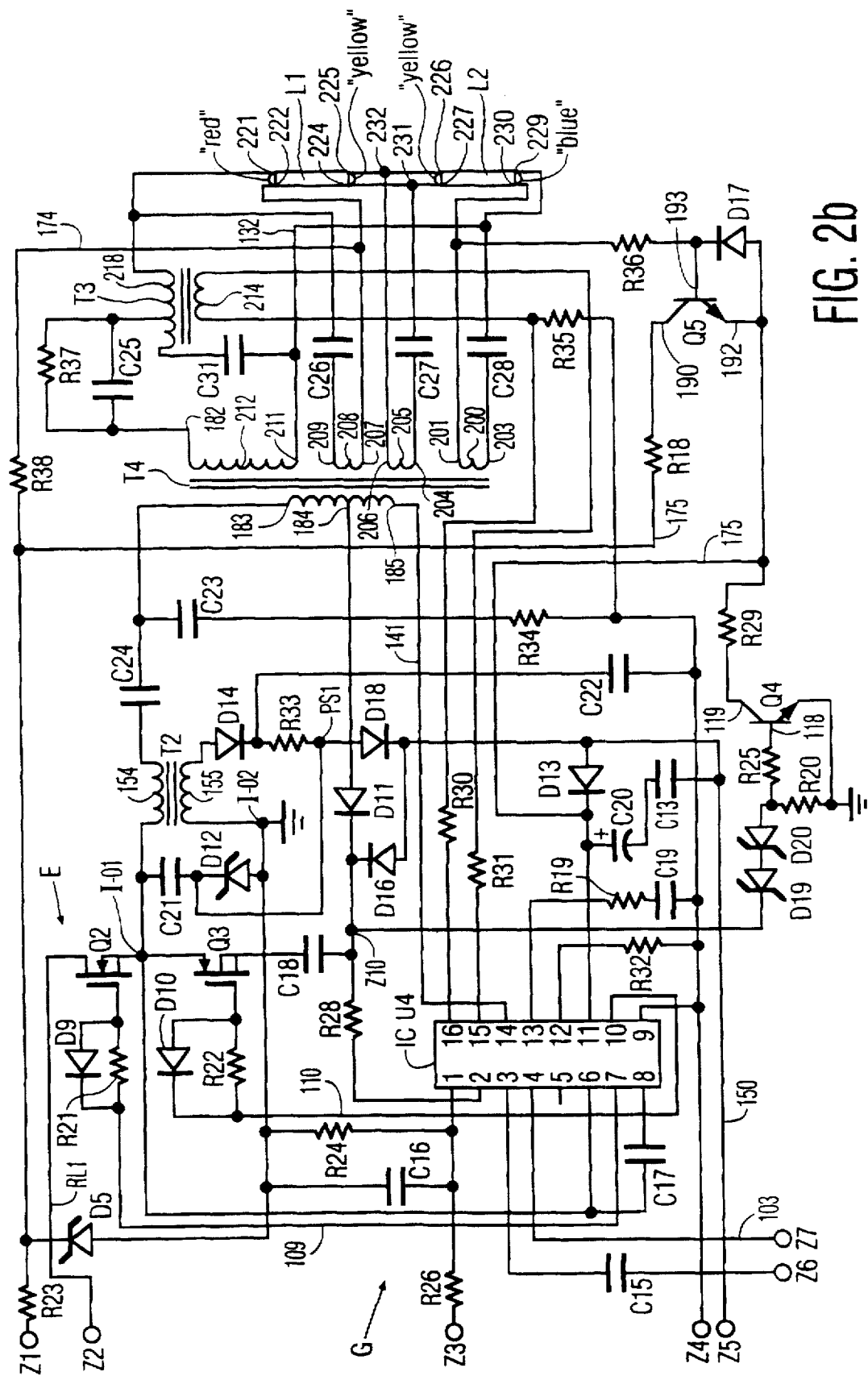

The inverter (FIG. 2(b)) includes a pair of switches Q2 and Q3 which are arranged in a half-bridge configuration and convert the DC voltage from the pre-conditioner circuit to a high frequency substantially square wave AC output signal across the inverter outputs IO1 and IO2, under the control of control circuit G.

The switches Q2 and Q3 are mosfets. The drain of switch Q2 is connected via the rail RL1 to output 80 from the pre-conditioner circuit. The source of the switch Q2 is connected to the drain of the switch Q3. The control gate of the switch Q2 is connected via control line 109 to a respective gate controller terminal G1 (pin 7) of controller U4 of the control circuit via a parallel arrangement of a resistor R21 and a diode D9. The anode of the diode D9 is connected to the control gate of the switch Q2. The diode D9 and resistor R21 provide rapid evacuation of charges from the control gate to enhance switching speed. The control gate of the switch Q3 is similarly connected to gate control terminal G2 (pin 10) of IC U4 through line 110 via a similar parallel arrangement of a diode D10 and a resistor R22. Line 111 connects the midpoint IO1 between the source of the switch Q2 and the drain of the switch Q3 to the controller circuit G and to one end of the capacitor C21.

Circuit G: Inverter Controller Circuit

Figure 4:
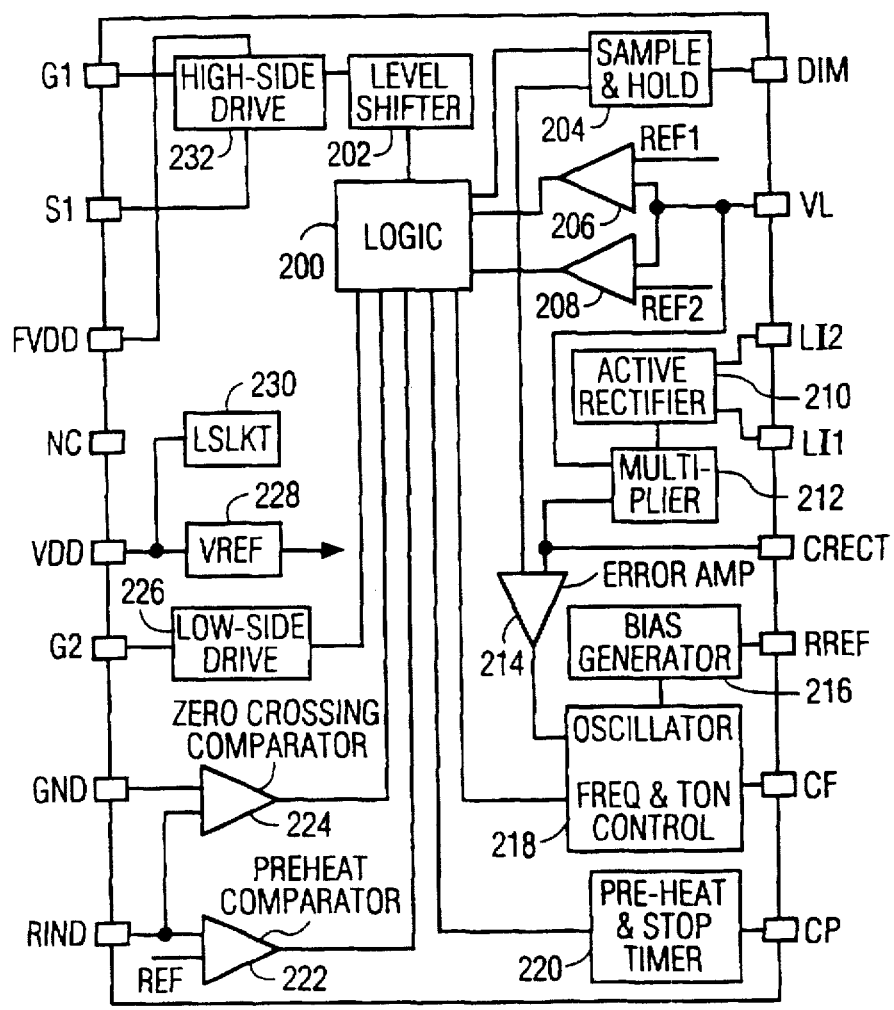
FIG. 4 is a block diagram of the IC U4 of circuit D.

The controller circuit G (FIG. 2(b)) controls the operation of the half-bridge inverter. The heart of the controller circuit is a 16 pin microcontroller U4, whose block diagram is shown in FIG. 4.

Figure 5:
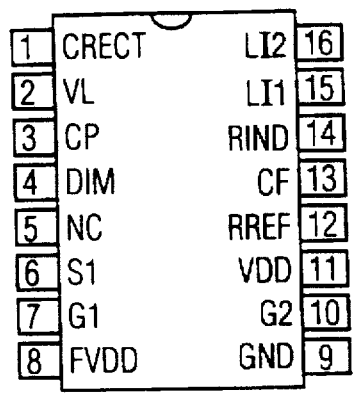
FIG. 5 shows the terminal pin arrangement for the IC U4 used in circuit D of FIG. 2(b)

The IC U4 contains a half-bridge driver for switches Q2 and Q3 as well as control circuits for preheat, ignition, on-state, dimming and protection. Dimming is achieved through closed loop control of a feedback sense of current and voltage down to 10% light level through the use of a semi-triangular oscillator used to implement forward conductance control. The various control circuits of IC U4, shown in FIG. 4 and identified with reference numerals 200-232, will be referred to in the following description of pin connections and in the discussion of half-bridge operation. The actual pin arrangement employed in the IC U4 of FIG. 2(b) is illustrated in FIG. 5.

Figure 2C:
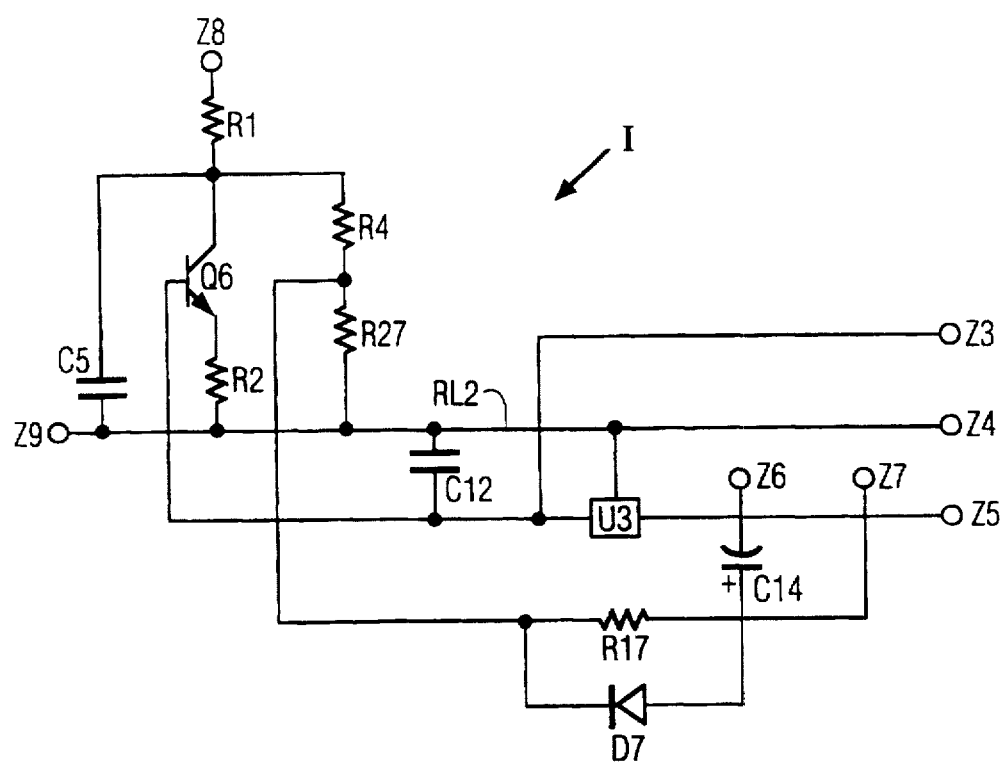

Pin 1 (CRECT) is connected to a 5 V DC output of the voltage regulator U3 (FIG. 2(c)) via the resistor R26. The CRECT pin is connected to the output of multiplier 212 and provides a current that represents the lamp power into the CRECT capacitor C16 and RRECT resistor R24. The resistor R24 sets the gain of the multiplier 212 while the capacitor C16 filters the high frequency ripple in the CRECT output current and also determines the time from lamp ignition until full lamp power regulation. Pin 2 (VL) senses an averaged lamp voltage, via its connection to a tap on the primary winding 184 of transformer T4 of the output circuit F through a series connection of a resistor R28 and a diode D31, which is input to the multiplier 212 and error amps 206, 208. Pin 3 (CP) is connected to a timing capacitor C15, which sets the preheat time and stop timing duration of the preheat and stop timer 220. Pin 4 (DIM) receives a dimming control signal via line 103 from the dimming interface circuit, which dimming signal is applied the sample and hold circuit 204. Pin 5 remains unconnected. Line 111, which extends from junction I01 between the switches Q2 and Q3, is connected directly to pin 6(SI) and is connected to pin 8 (FVDD) via a bootstrap capacitor C17. Pin SI is a floating source pin for the high side driver 232 of switch Q2 while pin FVDD is the supply voltage pin for high side driver 232. The bootstrap capacitor C17 is charged by an on-chip diode during each time that switch Q3 is in the conducting state. Line 109, which is connected to the control gate of the switch Q2 via the parallel arrangement of resistor R21 and diode D9, is connected to pin 7(G1) the output of the high side driver 232.

Pin 9(GND) is connected to ground (rail RL2). Pin 10 (G2), the output of the low side driver 226, is connected to line 110, which is connected to the control gate of the switch Q3 via the parallel arrangement of the diode D10 and the resistor R22. Pin 11 (VDD) is the power supply input for IC U4 and is the voltage supply for the low side (ground level control) of the inverter. Pin 11 is connected to line 175 from the safety circuit H (to be further described) and to the high side of the VDD supply capacitor C20. Pin 13(CF) is connected to the rail RL2 through the series connected capacitor C19 and a resistor R19, which set the forward conduction "FWD" time of switch Q2, Q3 output by the oscillator and frequency control circuit 218. The capacitor C19 also sets the frequency of oscillation of the inverter. Pin 14 (RIND) monitors inductor current through its connection to the end 185 of the primary winding 184 of transformer T4 to by a line 141. Pin 15 (LI1) is connected to one side of a sense resistor R35 through a first input resistor R31, and pin 16 (LI2) is connected to the other end of sense resistor R35 through the identical resistor R30. Pins LI1 and LI2 sense differences in lamp current between the lamps L1 and L2, for the active rectifier 210, by means of the sense resistor R35 to which a bias current is applied by the secondary winding 214 of transformer T3.

Circuit F: Resonant Tank Output

The output circuit (FIG. 2(b)) provides a proper output voltage and current to the fluorescent lamps L1 and L2. The output circuit also provides filament heating for lamp ignition.

The output circuit has a first pair of output terminals 221, 222 for connection to a first pair of lamp contacts between which extends a first (hereinafter "red") filament of the lamp L1, a second pair of outputs terminals 234, 232 for connection to a respective pair of lamp contacts 224, 225 and 226, 227 on each of lamps L1 and L2 between which a second and third (hereinafter the "Yellow") filaments extend, and a third pair of output terminals 229, 230 for connection to a respective pair of lamp contacts between which a fourth (hereinafter the "blue") lamp filament extends.

The output circuit includes an LCCR type resonant tank formed by the primary winding 154 of transformer T2, the DC blocking capacitor C24, the capacitor C23 and the lamp impedance reflected at the primary winding 184 of isolation transformer T4. The capacitor C24 blocks DC components of the inverter output voltage generated at node I01. Prior to ignition, the lamp impedance is very high so the Q curve is set primarily by the inductance of winding 154 and the capacitance of the capacitor C23. After ignition, the impedance of the lamps reflected at winding 184 of transformer T4 shifts the Q curve in the well-known manner.

The first ends of the first 154 and second 155 windings of the transformer T2 are connected via series arrangement of a zener diode D12 and a capacitor C21. The diode D12 and capacitor C21 form a so called dv/dt supply, and along with the zener diode D14 and the resistor R33 connected to the second end of the winding 155, a dual voltage supply at the node PS1 when the inverter is oscillating. A node between the cathode of the diode D14 and the resistor R33 is connected to ground (rail RL2) via a capacitor C22.

An iron core transformer T4 includes a primary winding 184 having one end 183 connected to the DC blocking capacitor C24. The other end 185 of winding 184 is connected directly to the RIND pin of IC U4 by line 141. A suitable voltage for igniting and operating the lamps L1 and L2 is provided by the secondary winding 212 of the transformer T4, which has one end 211 connected to the lamp contact terminal 229 via line 132 and its other end 182 connected to the lamp connection terminal 221 through a parallel arrangement of a resistor R37 and a capacitor C25, which arrangement is connected at a tap of a winding 218 of the transformer T3. The secondary winding 214 of transformer T3 provides a bias current for a sense resistor R35, which senses differences in lamp current between lamp L1 and L2.

Filament windings 200, 205 and 208 provide a current through the red, yellow and blue filaments, respectively, for filament heating. Filament winding 208 has one end 207 connected to the output terminal 222 and its other end 209 connected to output terminal 221 and to the end 219 of primary winding 218 of transformer T3 via a capacitor C26. Output terminal 232 is connected directly to one end 206 of the filament winding 205 and output terminal 231 is connected to the other end 204 of winding 205 via a capacitor C27. Output terminal 230 is connected to one end 201 of filament winding 200, the other end 203 of which is connected to output terminal 229 and the other end 211 of secondary winding 212 via a capacitor C28. The capacitors C26, C27, C28 serve to regulate changes in filament heating voltage, provide some impedance if the leads of filament windings are shorted, and aid the function of the safety circuit as will be further described.

Circuit H: Safety

The safety circuit H of FIG. 1 includes a stop circuit for stopping the oscillation of the half-bridge of the AC-DC converter in the event that one or both of the lamps is removed from the lamp contact terminals to prevent the presence of a dangerous voltage level at the lamp contact terminals. This is a back-up safety function in the event that the primary stop function provided by IC U4 fails to shut down inverter oscillation. The safety circuit H also includes a restart circuit for sensing when a lamp having two intact filaments has been inserted in place of a defective lamp and for restarting the IC U4 so as to operate the two fluorescent lamps.

The safety circuit included in FIG. 2(b) is shown isolated in FIG. 5 and includes switches Q4 and Q5, which are bipolar NPN transistors. The base 193 of the switch Q5 is connected to a junction between the end 201 of filament winding 200 and output terminal 230 via a resistor R36. The collector 190 of switch Q5 is connected through the resistor R18 to a junction between the resistors R38 and P23. A diode D17 has its cathode connected to the base 193 and its anode connected to the emitter 192 of the switch Q5. The emitter 192 is also connected via line 175 directly to pin VDD, the power supply pin for the microcontroller U4 and the ground level of the inverter. The resistor R29 is connected between the emitter 192 of switch Q5 and the collector 119 of switch Q4. The base 118 of transistor Q4 is connected to one end of a resistor R25, the other end of which is connected to a node between one end of the resistor R20 and the series connected zener diodes D19 and D20. Zener diode D20 is connected to node Z10 in the line which senses lamp voltage.

Ballast Operation Without Phase Control Dimming

When the ballast is turned ON, i.e. the power line voltage is applied to the input terminals 1', 2', a 120 Hz, 170 V peak fully rectified DC voltage is present at the outputs 13, 18 of the full bridge rectifier. (FIG. 2(a))

When two good lamps are present (i.e. both filaments in each lamp are intact), the IC U4 is supplied with power in the following manner. Current flows through the resistor R23 from the DC rail RL1. The zener diode D8 clamps the voltage at +25 V DC which is applied to the resistor R38, which causes a DC current to flow from line 174 through the red filament (in the direction from lamp connection terminal 222 to 221), through the winding 218 of the transformer T3, the resistor R37 and winding 212 of the transformer T4 and then through the blue filament (in the direction from lamp connection terminal 229 to 230). Current then flows through the resistor R36 to the base of transistor switch Q5, causing switch Q5 to conduct. The VDD supply capacitor C20 is then charged through the resistor R18 and line 175 so that a voltage is present at pin VDD which turns the controller U4 ON. After the inverter begins oscillating, discussed hereafter, the supply capacitor C20 remains charged through diodes D18 and D13 from the voltage supply at node PS1, previously discussed. (FIG. 2(b))

Initial Startup

Figure 7:
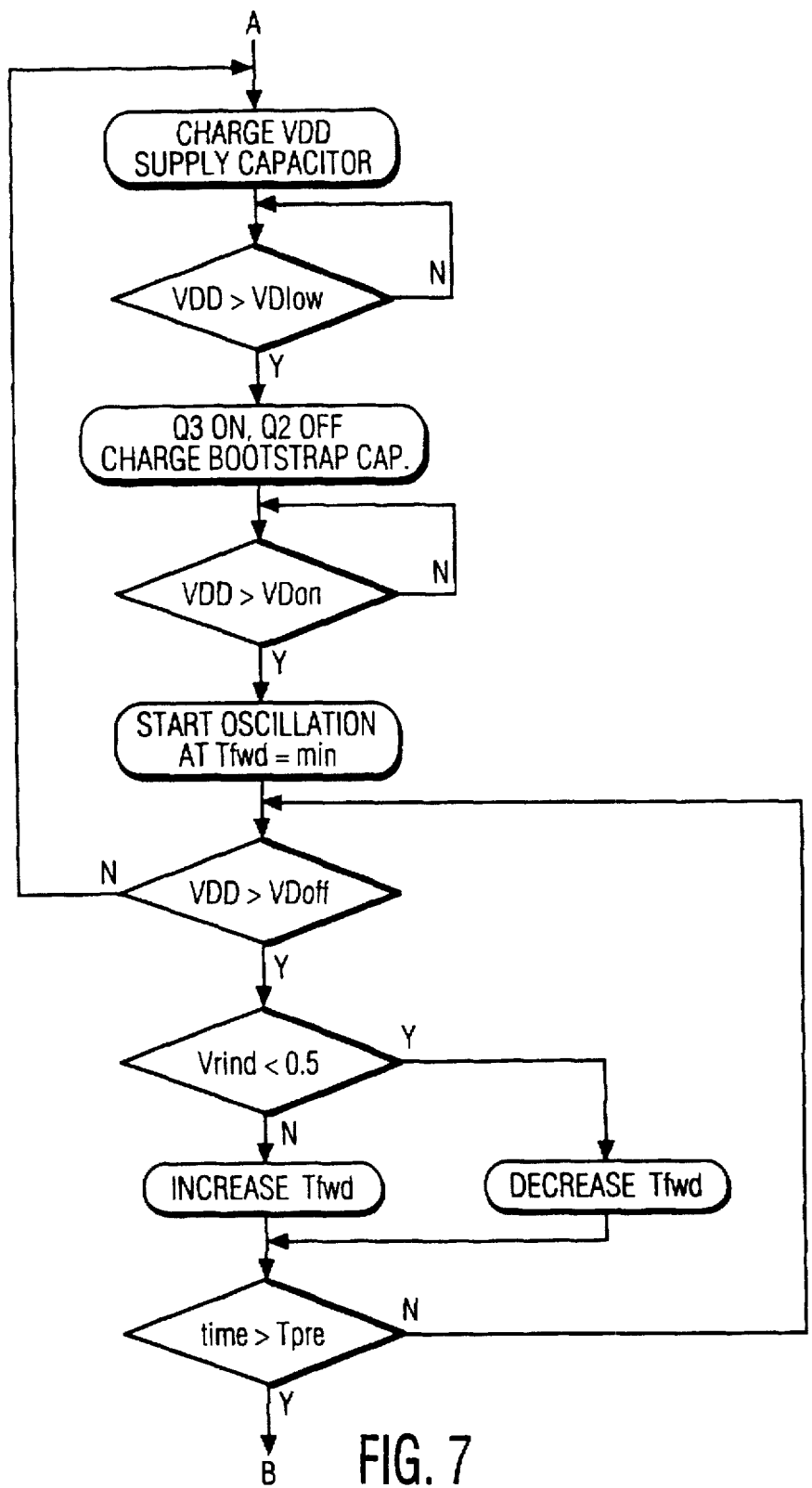
FIG. 7 is flowchart of the start-up and pre-heat stages for the controller U4.

A flowchart illustrating the start-up of IC U4 and of the pre-heat phase is shown in FIG. 7. Throughout the initial charging of VDD supply capacitor C20, which occurs for a voltage at pin VDD in the range of 0 V to a voltage "VDon" of about 12 V, the IC U4 is defined to be in a "startup" state. During the startup state, the IC U4 is in a non-oscillating condition and simultaneous conduction of Q2 and Q3 is prevented throughout this phase.

For the voltage at the VDD pin exceeding a level "VDlow" of about 6 V, switch Q3 will be on and switch Q2 will be off to ensure that the bootstrap capacitor C17 is charged through the internal bootstrap diode to a voltage level near VDD at the end of the initial charging phase. Also, the capacitor C19 tied to pin CF is charged to a level of "Vreg" of about 5 V at the end of the startup phase.

Oscillation

Figure 9A:
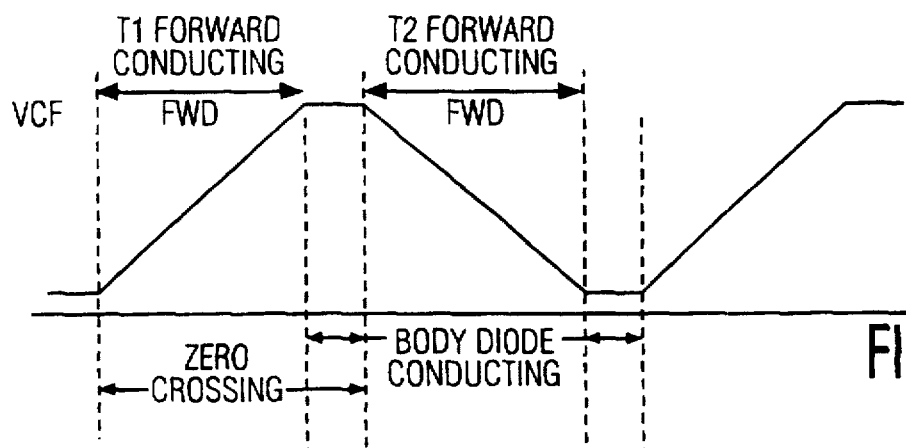
FIGS. 9(a)-9(c) shows three waveforms illustrating the forward conductance control outputs of the controller U4.
Figure 9B:
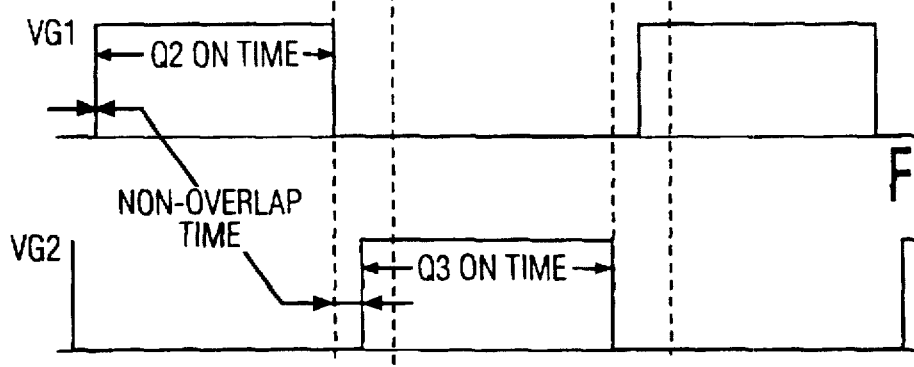
Figure 9C:
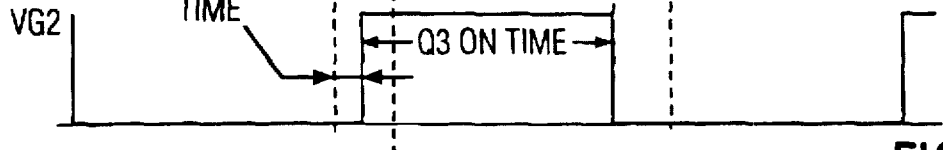

Once the supply capacitor C20 is charged to a value above Vdon, the IC U4 switches into the preheat state, and oscillation commences. The oscillator 218 via the logic circuit 200, level shifter 202, and the high 232 and low 226 side drives alternately switches transistors Q2 and Q3 into conduction with an identical forward conductance time FWD. (FIG. 9(a)) The duration of non-overlap between conductance of Q2 and Q3 (non-overlap time) is fixed at about 1.4 µs by the reference resistor R32. The oscillator normally operates in the forward conductance mode of control by implementing a semi-triangular voltage waveform "VCF" at the CF pin.

Figure 11A:
FIGS. 11(a)-11(d) show voltage waveforms on the gates of switches Q2 and Q3, the half-bridge node, and at the RIND pin of controller U4, respectively.
Figure 11B:
Figure 11C:

Given an inductive mode of operation of the half-bridge, the flat portion of the VCF waveform corresponds to body diode conduction (of the mosfets Q2, Q3) whereas the sloped portions coincide with actual transistor (forward) conduction. Forward conduction cannot start before the end of the non-overlap time. The duration of the sloped portions is the previously referred to "FWD" time. Moreover, the rising slope coincides with the forward conductance of the top half-bridge switch Q2 and the falling slope with the forward conductance of the bottom half-bridge switch Q3. The end of the body diode conduction is detected by a zero crossing at the RIND pin. The resulting semi-square wave half-bridge voltage VHB (See FIG. 11(c)) at half-bridge output 101 at pin S1 is then used to drive the resonant tank output circuit F.

Starting Oscillation

Once the supply capacitor C20 is charged above VDon, the oscillation begins by discharging the CF capacitor C19 which had been charged to Vreg during the startup phase. When the voltage at pin CF reaches a first level "VCF1" of about 1 V, switch Q3 is turned off, and the non-overlap timing is started. Following the non-overlap duration, switch Q2 is brought into the conducting state and the CF capacitor C19 simultaneously begins charging. Normally, the CF capacitor C19 begins charging only when a zero crossing is detected at the RIND pin. However, there is no guarantee that a zero crossing can be detected in the first switching cycle due to offsets in the comparator 224, so a non-overlap timer within circuit 218 is used to start the first FWD charging period at the CF pin. Following this first cycle, the RIND function works in the normal fashion.

Once oscillation begins, the same voltage present at supply node PS1 which charges the supply capacitor C20, is provided via line 150 to the VDD pin of the IC U1 and the pre-conditioner circuit commences operating in the manner previously described.

Forward Conductance time sweep and preheat control

The IC U4 starts oscillation with the minimum FWD time and gradually increase this time at a controlled rate equal to "SWPdwn" (see FIG. 10(a)). During the pre-heat stage, the preheat comparator 222 compares the voltage of pin RIND, resulting from the inductor current through the primary 184 of transformer T4, with a preheat threshold reference voltage "Vpre" of about −0.5 V. If the voltage sensed at the RIND pin is below Vpre at the time Q3 is switched off, the increase in FWD time stops and is then followed by a decrease in FWD time. This results in a regulated inductor current through the primary coil 184 of transformer T4, and consequently a regulated lamp electrode current, for the duration of the preheat cycle. In the present embodiment, the rate of decrease in frequency (or 1/FWD), "SWPdwn", is 0.017% per cycle; the rate of increase in frequency (or 1/FWD), SWPup, is equal to 3 times SWPdwn, both at a typical inverter frequency of 85 KHz during preheat (FWD time equal to 2.94 µs). The rate of increase and decrease in FWD time is fixed by an internal switched capacitor circuit within IC U4 which maintain a constant ratio independent of FWD time. The slope of the change in FWD time is also a fixed on-chip solution and cannot be changed externally.

Preheat time

The preheat cycle begins at the instant oscillation starts and its duration, "Tpre", is determined by the capacitor C15 tied to the CP pin and the reference current set by the resistor R32 tied to pin Rref. In the current embodiment, Tpre is set at about 0.9 seconds. (FIG. 10(d))

FWD sweep to ignition

Figure 8:
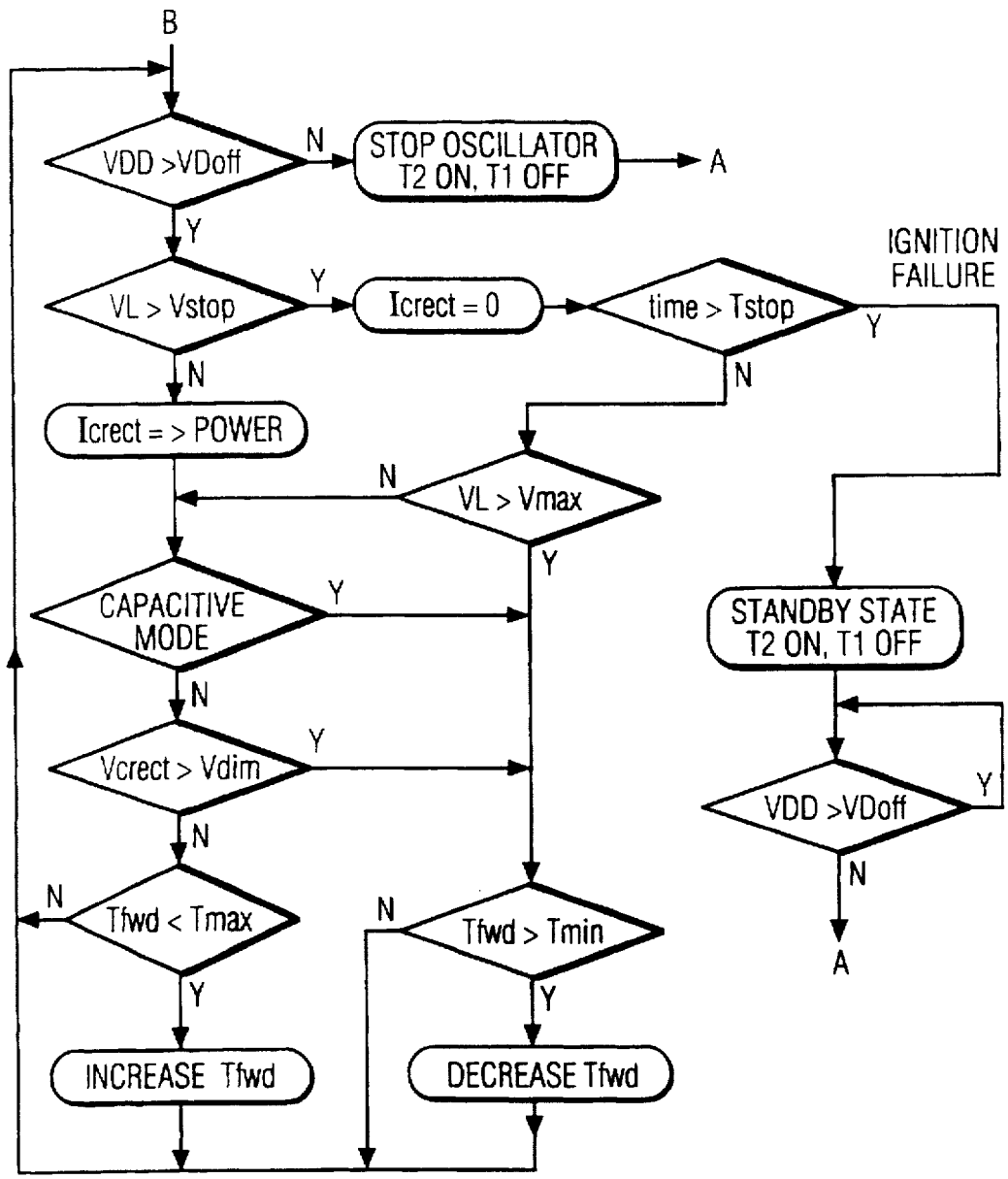
FIG. 8 is a flowchart for the ignition and normal operation stages of the controller U4.

The flowchart for ignition and normal operation is illustrated in FIG. 8. After the preheat time is over, the FWD time increases further, now without regard to the Vpre level at pin RIND. (See FIG. 10(a)) The rate of decrease in frequency (or 1/FWD) is equal to SWPdwn. During this upward sweep in FWD time the circuit approaches the resonance frequency of the load. Consequently, a high voltage appears across the lamp which normally results in lamp ignition. (FIG. 10(b))

Failure to ignite

Failure of the lamp to ignite will be detected by sensing the rectified open circuit lamp voltage at pin VL. An averaged representation of the rectified lamp voltage, in the current embodiment from a tap on the primary 184, is fed as a current signal into Pin VL.

The logic circuit 200 includes a STOP function which is available at the instant ignition sweep starts and is present during normal operation. If the current into pin VL exceeds a level corresponding to a lamp voltage of Vstop, at the time Q3 is switched off, then the stop timing circuit 220 is activated and the output current from the CRECT pin is made zero. The stop timing duration, "Tstop", is set by the capacitor C15 tied to the CP pin and may be equal, for example, to about half of the preheat time. If the open circuit lamp voltage falls below Vstop before Tstop is exceeded, again at the time Q3 is switched off, then the lamp is considered to have ignited, the stop timing counter 220 is reset, and the multiplier 212 acts normally, feeding a current proportional to the product of lamp voltage and current into the CRECT pin. However, if the stop timing duration is completed, the lamp is considered to have not ignited. At the next conductance cycle for Q3, the half-bridge will be put into the non-oscillating or standby state. Only one ignition attempt is made. The Vstop level is chosen to be just above (+10%) the maximum lamp voltage under dimming conditions, which occurs at the lowest light setting. In the current implementation, Tstop, Vstop, and Vmax have been selected as ½ sec, 450 V, and 900 V, respectively.

If the current into pin VL exceeds a second defined level corresponding to an open circuit lamp voltage of Vmax, at the time Q3 is switched off and before time Tstop is exceeded, then the upward sweep in FWD time is stopped and is followed by a decrease in FWD time. When the open circuit lamp voltage drops below Vmax the downward sweep stops and is followed by an increase in FWD time. The rates of increase and decrease in frequency (or 1/FWD) are equal to SWPup and SWPdwn, respectively. This mode of dynamic lamp voltage regulation continues until the lamp ignites or the time Tstop is exceeded.

Standby state

The standby state is characterized by Q2 being off and Q3 being on, and the voltage at pin VDD being greater than VDoff. This state is exited by powering down the IC U4 (by removing the mains supply at input terminals 1',2'), and powering back up to above VDon. The standby state is also exited by the restart function of the safety circuit.

Normal operation

After a normal ignition, the FWD time continues to increase at a rate equal to SWPdwn. However, since the lamp has ignited there is a large increase in lamp power which is detected by the lamp current and voltage sensing pins (L1 and VL), and converted into an output current at the CRECT pin which is proportional to the averaged lamp power. Consequently, the capacitor C16 tied to CRECT will start to charge from its initial value of zero volts up to a value equal to that at the DIM pin. The voltage at the DIM pin will be described in greater detail hereafter with reference to the dimming interface circuit. Once the voltages at pins CRECT and DIM are equal, the error amp 214 and the oscillator control 218 maintains their equality (thereby regulating the lamp power) by constantly adjusting the FWD time.

The delay from the moment of ignition to the time the lamp power reaches its regulated value is determined primarily by the charging time of the CRECT capacitor C16. With the dim 1 level set at 100% light output, the FWD time continues to increase (at the rate SWPdwn) until the voltage at CRECT reaches its maximum value of 3 V and the feedback loop closes. (See FIGS. 10(a), 10(b)). With the dim level set at its minimum level, the CRECT capacitor only has to charge to about 0.3 volts before the feedback loop closes and drives the FWD time back down almost instantaneously to reduce the light level. As a result, the duration of the high light condition following ignition is very short for low dim settings, and the visual impact of the undesirable "light flash" is minimized.

Dimming

Dimming of the lamp is accomplished through the closed loop control of the average lamp power. The voltage at the CRECT pin, representing the average lamp power, is compared to the dimming reference voltage applied at the DIM pin. An internal high gain error amplifier 214 drives the FWD time of oscillator 218 until the difference between these two inputs is reduced to near zero, resulting in a linear and proportional control of the lamp power with the DIM voltage. The waveform at the DIM pin is internally sampled by the sample and hold register 204 during the last fourth of the falling sloped portion of the VCO waveform, and held just prior to the falling edge of the Q3 gate drive signal. The useful input range at the DIM pin for dimming control is between a maximum level of 3 V, and a minimum level of 0.3 V. Voltages greater than 3 V have the same effect as the maximum, and voltages less than 0.3 V are equivalent to the minimum. The lamp control loop is only closed following a successful lamp ignition. External changes in the DIM control voltage are set to be slower than the rate of change in voltage at the CRECT pin (set by the RRECT resistor R24 and CRECT capacitor C16).

Lamp current rectification

The active rectifier 210 (FIG. 4(a)) provides a full-wave rectified representation of the AC lamp current waveform for use in regulating the lamp power. It consists of a bipolar current amplifier, whose inputs are formed by pins L11 and L12, and an external resistor network including the sense resistor R35, and a pair of identical input resistors, R30 and R31. The AC lamp current is converted by this resistor network into a differential current, ILdiff, at pins L11 and L12. The output of the amplifier 210 feeds a current, which is equal to the absolute value of the differential input current, to one of the inputs of the multiplier circuit 212. Very low lamp current levels are accurately rectified and controlled by employing such an active circuit for the rectifier function.

The rectifier function operates in the following way. An AC lamp current flowing through the sense resistor R35 results in a proportional AC voltage across its terminals. Each end of the resistor R35 is connected through a respective input resistor, R30, R31, to one of the two input pins L11, L12. These pins act as current sources that maintain a zero difference voltage between the pins, and a common mode voltage given by:

$$Vli1=Vli2=max\ (V1,\ V2)+R31*ILbias$$

where V1 and V2 are the voltages of the two ends of the sense resistor R35 and Ilbias is a bias current provided by the transformer T3.

With zero lamp current there is no voltage across R35 and consequently no difference in voltage between the two resistors R30 and R31. Consequently, the resistors R30, R31 will have identical voltage drops equal to R30*ILbias and R31*ILbias. When a lamp current is present, the voltage induced across R35 is also dropped across one of the resistors R30, R31 such that the current through it increases (by ILdiff) while the current through the other one remains at a constant value of ILbias. The output current from the active rectifier 210 is approximately equal to the absolute value of the differential input current which is given by:

ILdiff=Ilamp*R35/R31

Lamp power regulation

An on-chip multiplier 212 (FIG. 4(a)) generates the product of lamp voltage and current during normal closed loop operation. The averaged representation of the rectified lamp voltage is fed as a current signal into pin VL where it is applied to one input of the multiplier 212. A second input to the multiplier 212 is obtained from the output of the active rectifier 212. The product of the lamp voltage and lamp current is available as an output current at pin CRECT, where it is injected into the parallel network consisting of the RRECT resistor R24 and CRECT capacitor C16. The voltage at the CRECT pin provides a filtered representation of the average lamp power. CRECT capacitor C16 is also used to stabilize the feedback control loop. In a typical application circuit, the 3 to 0.3 V control range set by the DIM function results in an equivalent variation in the CRECT voltage (for a linear resistor at CRECT), and consequently in a lamp power range of 10:1 with a minimum light level of 10%.

Capacitive-mode protection

Figure 11D:
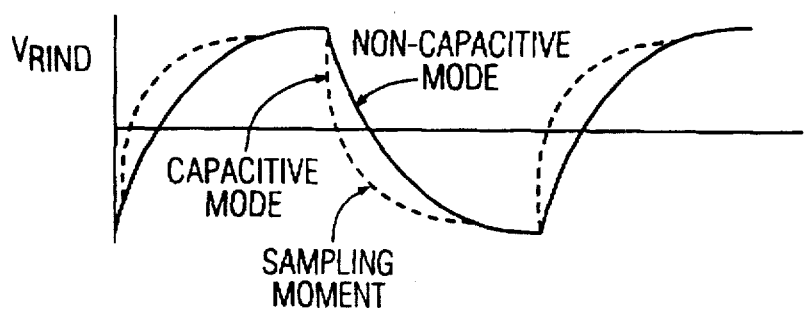

The IC U4 protects the inverter and output circuits against getting too close to a capacitive mode of operation. The voltage across the shunt resistor R34 is monitored by means of pin RIND. The state of the RIND pin is sampled at the start of conduction of either switch Q2 or Q3, and by checking the polarity of the signal a determination is made if the body diode of the respective switch is conducting. If the voltage at pin RIND is negative at the moment that switch Q3 is switched into conduction, then the body diode in Q3 has stopped conducting and the circuit is assumed to be close to or in capacitive mode. (FIG. 11(d)) Similarly, if the voltage at pin RIND is positive at the moment that Q2 is switched into conduction, the circuit is again assumed to be close to or in capacitive mode. Consequently, the logic circuit 200 will cause the oscillator and control circuit 218 to increase the frequency (or 1/FWD) a rate of SWPup for as long as capacitive mode is detected, and decrease at a rate of SWPdwn down to the regulated 1/FWD frequency if capacitive mode is no longer detected.

If a lamp is removed or fails after normal operation has commenced, the change of impedance reflected at the primary 184 of isolation transformer T4 will shift the Q-wave, and cause the inverter to enter a capacitive mode of operation. This will initially result in an increase in inverter frequency SWPup to the maximum frequency. The IC U4 will then enter the pre-heat and ignition procedure, leading to inverter shut-down due to Vmax being exceeded for a duration of Tstop.

Further Operation of the Safety Circuit

The safety circuit essentially requires that a DC current path extends through the red and blue filaments. The operation of the safety circuit has already been described for the start-up situation with two good lamps. As already discussed, the IC U4 has an internal STOP function which places the inverter in a standby state whenever the lamp voltage exceeds a predetermined level. When a lamp is removed or fails, then the lamp voltage sensed at pin V1 will exceed the preset stop level and the IC U4 will be put into the non-oscillating standby state.

Figure 6:
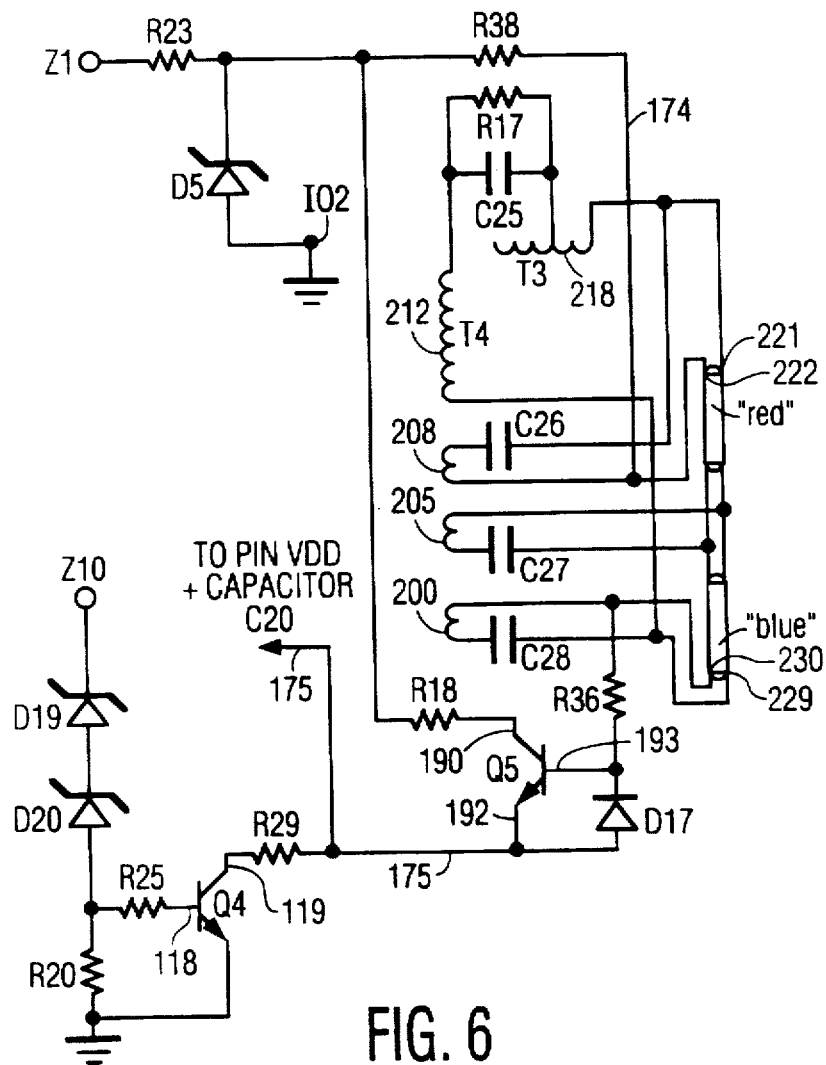
FIG. 6 is an isolated circuit diagram of the safety/start/restart circuit H.

The safety circuit H (FIGS. 2(b), 6) provides back-up shut-off protection to the STOP function which is internal to the IC U4. Whenever the voltage at node Z10 exceeds the voltage level corresponding to Vmax (of the IC U4 stop function) by about 10%, the zener diodes D19 and D20 will breakdown, allowing current to flow though the resistor R20 to ground. This renders the switch Q4 conductive, thereby draining the charge on the capacitor C20 to ground. This removes the voltage supply for the IC U4, turning IC U4 off and stopping inverter switching, resulting in switch Q5 switching back off.

The safety circuit also ensures that VDD power is re-supplied to the IC U4 when the failed lamp has been replaced by a lamp with good filaments, to thereby restart the IC U4 and inverter oscillation, when the mains supply is maintained at the input terminals 1',2' during replacement of the failed lamp. When the failed lamp is replaced with a lamp having two good filaments, the DC current will again flow through the blue and red filaments, causing the controller U4 to turn ON and cause the DC-AC converter to output a high frequency signal to the output circuit.

The circuit shown in FIG. 6 may not always prevent VDD power from being supplied to IC U4 if either of the red or blue filaments is broken, or either of the lamps is not present, during initial application of power to the input terminals 1',2'. If, for example, the blue filament has failed or is not present, current flow through line 174 will not be able to pass across terminals 222–221. However, since the ballast was initially off, the capacitor C26 will have no charge initially. Assuming that the ballast components have not been sized properly the current in line 174 could charge the capacitor C26, providing a current path through the winding 218 of transformer T3 and the remaining parts of the DC path previously described to render Q5 conductive, allowing charging of the VDD capacitor C20. The same effect will occur for initial charging of the capacitor C28 if the red filament is broken or not present during initial application of power to the input terminals 1',2'. Thus, it is possible for a voltage to appear at the output for the first ½ sec after ballast turn-on (Tstop) even if a lamp is not present. The isolation transformer T4 provides substantial protection against shock hazard in this event.

Figure 12A:
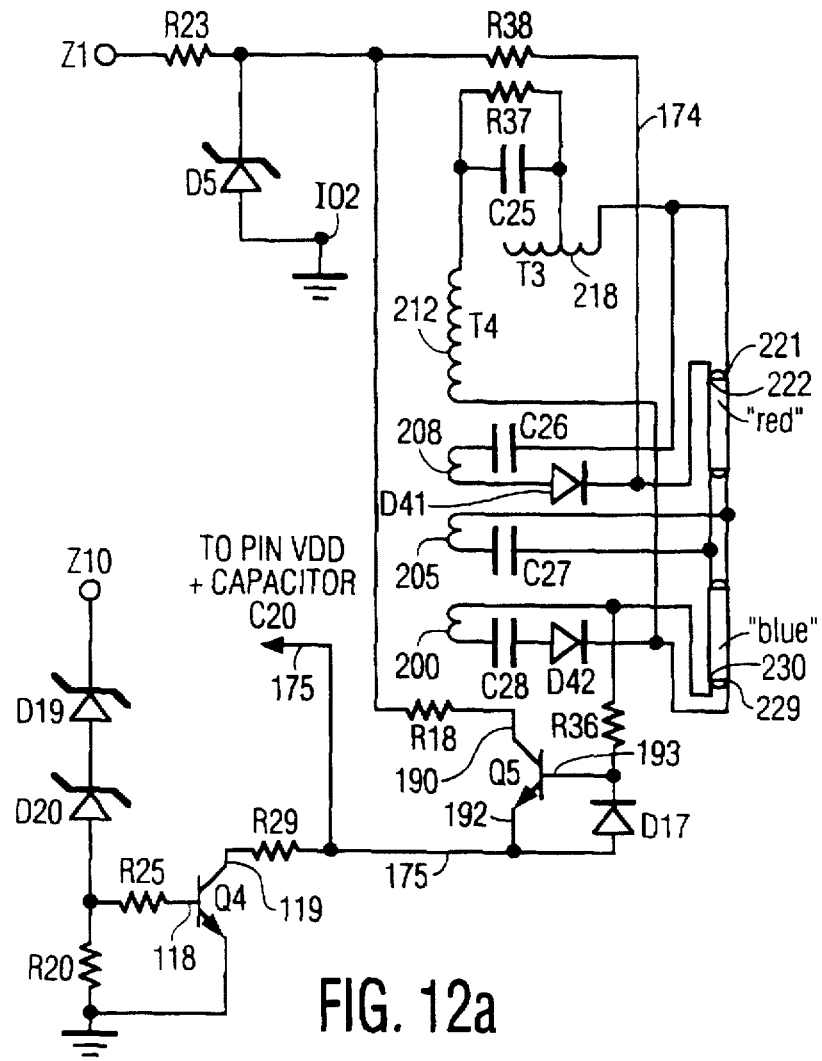
FIG. 12(a) is a circuit diagram of a second embodiment and FIG. 12(b) is an isolated view illustrating a third embodiment of the safety circuit H, each which prevents initial power-up of the IC U4 in the absence of lamps in the lamp terminals.

Still a further layer of safety is provided by preventing the VDD power from being initially supplied to the IC U4 when either of the lamps is missing or the red and blue filaments are broken. As shown in FIG. 12(a), a diode D41 is placed in series with the capacitor C26 and a diode D42 is placed in series with the capacitor C28. The diodes prevent DC current flow in the direction of the capacitors C26 and C28 when the red and blue filaments are broken or not present. This in turn prevents the switch Q5 from being rendered conductive, thereby preventing initial charging of the VDD supply capacitor C20 by means of the electric potential supplied from the rail RL1 through the resistors R23 and R18. Thus, unless the red and blue filaments provide a conductive path when power is initially applied at the input terminals 1',2', the IC U4 will not be turned on, the inverter will not oscillate, the IC U1 of the preconditioner circuit will not be supplied with power and no voltage will appear across the output terminals.

Figure 12B:
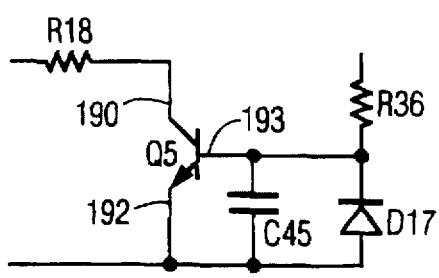

FIG. 12(b) illustrates another modification in which a capacitor C45 is connected across the base-emitter junction of switch Q5. The capacitor C45 forms a capacitor divider with C26. Though Q5 may initially turn on in the event of a missing lamp at ballast turn-on, C45 will begin the charge so that base-emitter voltage across Q5 drops, and turns Q5 off before a sufficient voltage is achieved across C20 to begin inverter oscillation.

DIMMING

Figure 13:
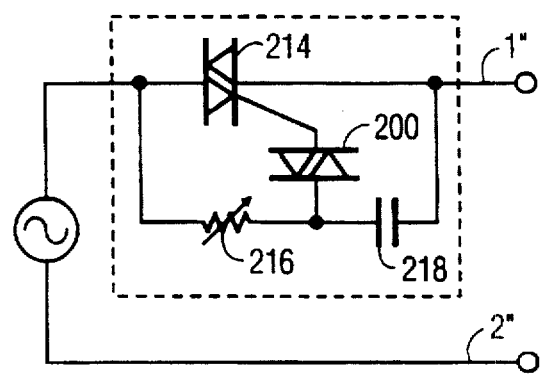
FIG. 13 is a circuit diagram of an external triac dimmer for use with the ballast according to the invention.
Figure 14A:
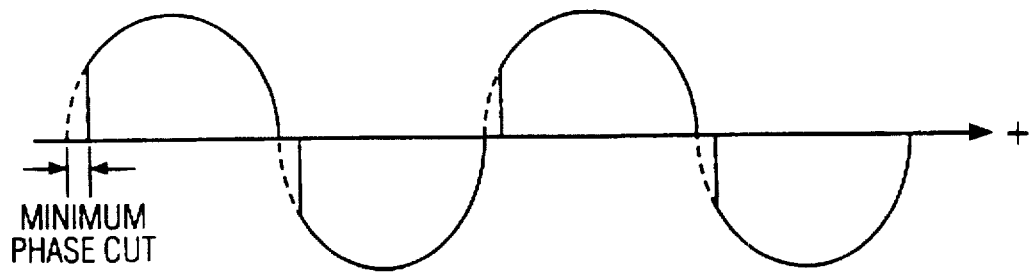
FIGS. 14 (a)-(b) show phase angle controlled input waveforms from the triac dimmer of FIG. 13.
FIG. 14(c) illustrates the full wave rectified voltage across rectifier outputs 13,18.
FIG. 14(d) illustrates the offset voltage sensed at the MULT IN pin of the IC U1.
Figure 14B:
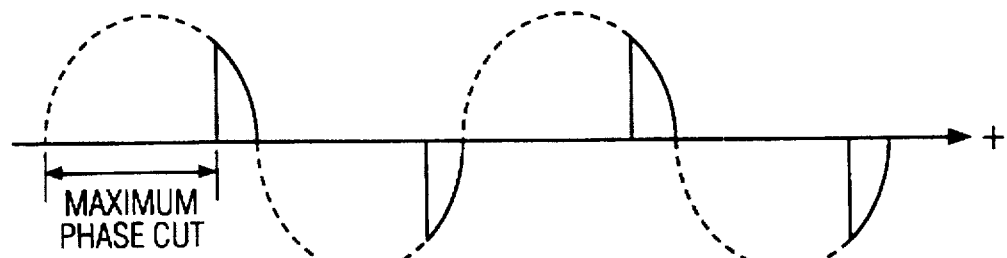

The above-described ballast includes circuitry especially adapted for use with a phase control dimmer. An exemplary phase control dimmer is shown in FIG. 13. The phase controller is provided with a triac connected in the power supply line 1". A series circuit consisting of a variable resistor 216 and a capacitor 218 is connected in parallel with the triac 214 for firing the triac 214 at an arbitrarily selected angle for phase conduction. A diac 200 is connected between a node of the variable resistor 216 and the capacitor 218, and the gate of the triac 14. By varying the resistance of the variable resistor 216, the phase controller supplies a voltage whose phase angle is controlled to the ballast input terminals 1',2'. Exemplary phase angle controlled waveforms are shown in FIGS. 14(a), 14(b). FIG. 14(a) shows a minimum phase cut (large conduction angle) corresponding to high light level and FIG. 14(b) shows a maximum phase cut angle (small conduction angle) corresponding to a minimum light level.

Input LC Filter and Pre-conditioner Offset

A distinctive feature of the ballast according to the invention is the design of the EMI filter and an offset feature of the pre-conditioner circuit. The LC filter provides EMI suppression and includes equally sized chokes L1 and L2 and capacitors C3 and C4. (FIG. 2(a)) In typical ballast applications, the LC filter is designed by selecting the appropriate pole frequency given by $f_p=1/(2\pi\sqrt{LC})$. Thus, the product of L and C determines the pole frequency. Generally, the inductance is selected to be small and the capacitance to be large so as to minimize the physical size of the inductors in the EMI filter. For a pole frequency of about 8 Khz, exemplary values are L=800 µH and C=0.5 ufd.

The proper operation of the external triac dimmer requires that the LC filter be sufficiently damped with the loading introduced by the pre-conditioner. Without proper loading, oscillations occur in the EMI filter which can cause the triac in the triac dimmer to fire improperly. Inadequate damping of the filter also leads to excessive peak current on the chokes L1, L2 and over voltage (up to double the line peak) at the input of the inverter.

The loading required to prevent improper triac firing is reduced by selecting the LC filter with a relatively high characteristic impedance. The characteristic impedance is related to the $\sqrt{L/C}$ so contrary to the standard design philosophy, the inductance must be made large relative to the capacitance. Thus, in FIG. 2(a) inductors L1 and L2 are made relatively large and the capacitors C4 and C3 are relatively small. A small physical size for the inductors L1 and L2 is achieved by using a powdered iron core.

The EMI filter impedance is selected so that the peak overshoot of the EMI filter is less than the average value of the DC bus voltage at worst line conditions. This is critical to prevent triac misfiring, since overshoot can cause negative currents that will misfire the triac in the dimmer. Additionally, the pre-conditioner only operates properly to control the power factor and DC bus voltage when the peak of the rectified input is less than the DC bus voltage. Additionally, peak overshoots greater than the DC bus stress circuit components. In selecting the impedance, the "Q" of the EMI filter is given by $Q=R/\sqrt{L/C}$, and $K=1/2Q$. The filter overshoot "Vovershoot" is given by the peak filter output voltage "Vopk"–peak input voltage "Vinpk", also given by $$\text{Vovershoot} = \text{Exp}\left[\frac{-\pi K}{\sqrt{1-K^2}}\right] = \text{Exp}\left[\frac{-\pi}{\sqrt{4Q^2-1}}\right]$$

In the FIG., L1 and L2 are each an E75-26 (Magnetics) core with an inductance of 2.3 mH and a saturation current higher than 2.0 A. The capacitance of C4 and C3 jointly was chosen to be 0.147 uF for EMI suppression, yielding a characteristic impedance ($\sqrt{L/C}$) of 188 ohms for the filter. R is the normal damping resistance presented by the pre-conditioner (for 60 W load and a 120 V line) and equals 240 Ω in the present implementation. For the present filter, Q=1.28, yielding a Vovershoot of 0.26. For worst line design condition Vinpk=1.26×187 V(i.e. (120 Vt+10%)√2))=236 V. This is much less than the 280–300 V DC bus voltage. By contrast, for the standard filter given above, the characteristic impedance $\sqrt{L/C}$=40, Q=6, Vovershoot=77%, leading to Vopk of 330 V, well above the DC bus voltage. This leads to triac misfiring as will be illustrated in FIG. 15(a).

The damping is further improved by making the preconditioner slightly non-linear near the zero-crossing of the input voltage. The selected IC (Linfinity LX 1563) has this non-linearity which manifests itself as a relatively increased "on" time for the boost switch Q1 with lower voltages at the multiplier input, $M_{IN}$, pin.

The damping is made completely adequate, however, for all dimming levels only by making the pre-conditioner operate continuously and reliably even when the input voltage is very low or zero, as is the case when the triac of the triac dimmer is blocking. This is accomplished by providing an offset voltage to the MULT IN pin.

Figure 14C:
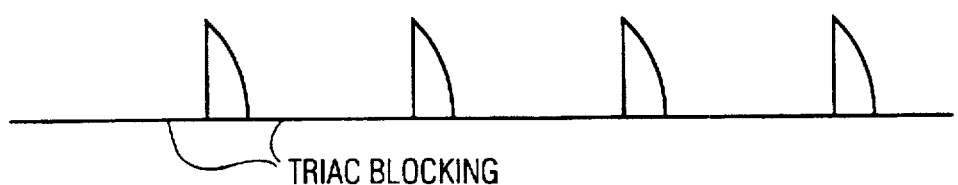

When the triac is blocking, the input voltage is zero for that portion of the 120 HZ rectified line voltage as illustrated in FIG. 14(c). The voltage across the input capacitor C4 should closely follow the rectified input voltage, i.e. it should mirror the waveform of FIG. 14(c). Without an offset voltage, the MULT IN pin would sense the (scaled) voltage across the capacitor C4. The switching of switch Q1 is determined by the peak inductor current in relation to the voltage at the MULT IN pin. Both the switching frequency and the duration of time that Q1 is conductive is greatest at the peak of the rectified DC voltage and decreases as this voltage decreases. When the voltage at the MULT IN pin is at or near zero, as is the case when the triac is blocking, the IC U1 tends to keep switch Q1 non-conductive to a much greater extent since the peak inductor current is kept small to follow the input or MULT IN voltage. For longer periods of Triac blocking there may even be periods when the switch is completely off. However, when the switch Q1 is non-conductive, there is no discharge path for the capacitor C4. Without a discharge path, the capacitor C4 cannot follow the rectified line voltage, in other words, the voltage across C4 will be held up.

By providing a small offset (125 mV) at the MULT IN pin of the IC U1, the total duration of time that the switch Q1 is kept conducting when the rectified voltage is at or near zero is increased and the switching is prevented from ever stopping. This allows sufficient discharging of the filter capacitor C4, allowing the voltage across the capacitor C4 to closely follow the rectified phase-controlled voltage. Thus, the preconditioner presents the LC EMI filter with a well damped resistive load during the entire line cycle and makes the triac dimmer fire uniformly.

Figure 14D:
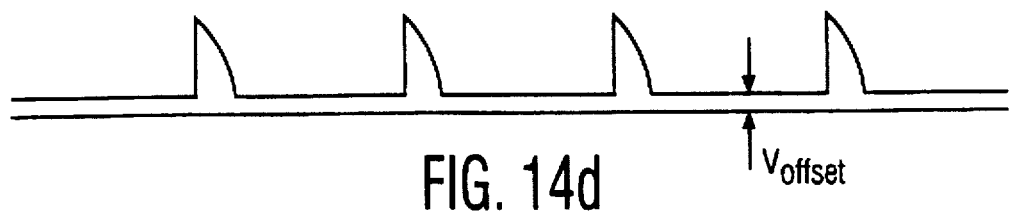
Figure 15A:
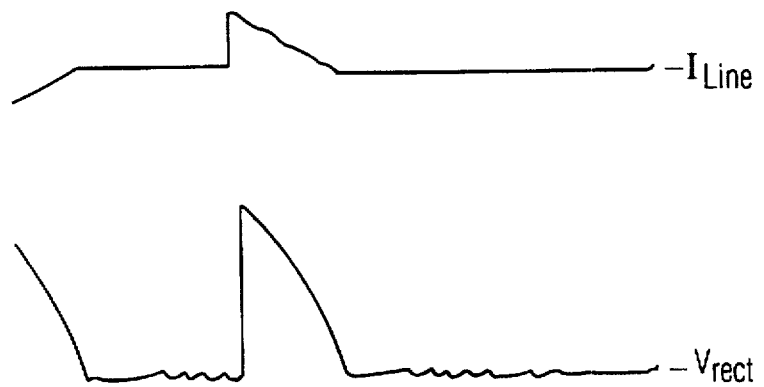
FIG. 15(a), illustrates the line current and rectified voltage in the case of triac misfiring.
Figure 15B:
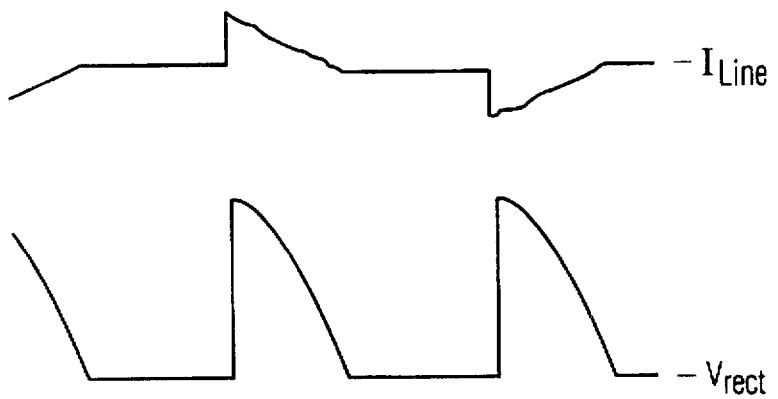

In the embodiment shown in FIG. 2(a), the offset voltage is accomplished by the resistor R8 of the pre-conditioner circuit. Whenever the inverter is operating, the inverter supplies a voltage to the $V_{in}$ pin. The resistor R8 bleeds off a small current to the junction between the resistors R5 and R6, which provides the offset voltage to the MULT IN pin. The voltage sensed at the MULT IN pin including the offset voltage is illustrated in FIG. 14(d). Thus, when the triac is blocking, the IC U1 will continue switching the switch Q1 at high frequency, presenting a resistive load to the capacitor C4. FIG. 15(b) illustrates the line current and rectified line voltage provided by the EMI filter and pre-conditioner according to the invention. Three cycles are illustrated, showing no triac misfiring. Without the use of this offset, the pre-conditioner does not load the LC filter for certain combinations of phase angle and lamp power levels when the triac is in the blocking state, which would occasionally cause the triac to misfire and cause flicker in the light output. FIG. 15(a) illustrates the same waveforms for an EMI filter with the conventionally selected impedance and without the pre-conditioner offset. Note that the triac has misfired resulting in blocking of the third cycle. The rectified line voltage also shows oscillation due to capacitive hold-up by the EMI filter.

The pre-conditioner offset is also significant for ensuring the accuracy of the dim signal from the interface circuit. As mentioned above, the voltage across capacitor C4 will be held-up and not mirror the phase angle input signal if it is not loaded properly. Such variations would appear in the dim signal output by the interface circuit and input to the DIM pin of the IC U4. Since the power control loop is the IC U4 is very fast, such variations would result in noticeable flicker.

CIRCUIT I: Dimming Interface

The dimming interface circuit (FIG. 2(c)) provides a dimming control signal for input to the DIM pin of the half-bridge driver U4 when a phase control dimmer is connected in the mains lines.

The dimming control signal output by the dimming interface circuit is the averaged value of the rectified line voltage. The averaged rectified line voltage decreases monotonically as the conduction angle of the AC input signal is decreased with a phase angle dimmer from a maximum to a minimum setting and thus is a good indicator of the setting of the dimmer. The average rectified line voltage is a function of conduction angle. Several factors must be taken into account in supplying the dim signal to the DIM pin of the controller U4.

As discussed previously, the voltage input at the DIM pin is compared to the averaged lamp power, represented by the voltage at the CRECT pin. The lamp control loop changes the FWD time until the difference between the voltage at the CRECT pin and at the DIM pin is reduced to nearly zero. The lamp control loop is very fast, having a cycle time of about 16 µs. When the voltage at the DIM pin is changed, the control loop will close generally within about five iterations, so the lamp current is changed to the new level in about 100 µs. Consequently, any change in the dimming voltage input at the DIM pin results in a nearly instantaneous change in the lamp current. In other words, the lamp current will essentially mirror changes in the dim signal. Since the dim signal is derived from the 120 HZ rectifier output and the lamp current mirrors the dim signal, it should have a very low 120 Hz ripple component so as to maintain a good crest factor (i.e. the ratio of the peak to rms value of the lamp current). A good crest factor is important for maintaining the rated life of tubular fluorescent lamps, since a poor crest factor reduces the life of the electrodes. The rectified line voltage signal, however, has an AC ripple component which becomes larger in proportion to the average DC value of the rectified line voltage at lower conduction phase angles. To maintain a good crest factor, the rectified line voltage needs substantial filtering before being input to the DIM input of the IC U4. In the current embodiment the, desired crest factor is 1.6.

The response time of the dimming interface must also be fast enough to avoid power imbalances, which affects the bus voltage on RL1 across the buffer capacitor C10, which should be maintained substantially constant (i.e., the average of the DC bus voltage staying within about +/−10%) for proper operation of the inverter. As mentioned above, the power control loop in IC U4 responds almost instantaneously to changes at the DIM input. The dim signal must react to changes in the input conduction angle with a speed at least of the same order of magnitude as that of the pre-conditioner. If the reaction time is slower, then when the conduction angle is decreased rapidly by the phase control dimmer, the controller U4 will lag behind the pre-conditioner. The controller U4 will still try to operate the lamps at a high light level, and the inverter will be drawing a relatively high power from the pre-conditioner, while the average input voltage to the pre-conditioner has already dropped. By selecting the interface to respond as fast or faster than the output of the pre-conditioner to increases in the conduction angle, this power imbalance situation is avoided. It should be noted that this power imbalance situation does not occur when the conduction angle is reduced since change in the dim interface, without the feedback loop of the preconditioner needing to respond.

Another consideration, important for the user, is that the change in light level should not noticeably lag behind changes in the setting of the phase control dimmer. In experiments conducted by the inventors, it was determined that the setting of dimmers now commercially available can be changed by a user from the highest to the lowest level, by movement of a slide controller for example, in about 50 ms.

The above requirements can be met with an interface circuit having a filter which responds fast (0–90%) in about 50 ms and which has an attenuation of about 30 dB at 120 Hz. The first factor satisfies the requirement for avoiding power imbalances while the latter provides the desired crest factor of 1.6.

Another function of the interface circuit is to scale the 120 HZ rectified line signal to provide a dimming voltage at the DIM input of the IC U4 which varies between a minimum level of 0.3 V and a maximum level of 3 V for the minimum and maximum conduction angles from the phase control dimmer.

The dim interface circuit is shown in FIG. 6 and includes a switch Q6 connected in series with resistors R1 and R2. The base of switch Q6 is connected to a 5 V output of the voltage regulator U3 and is always conductive when the inverter is oscillating. The interface circuit has a two-pole filter which includes a first RC filter formed by the resistors R1, R4, R27 and the capacitor C5 and a second RC filter formed by the resistor R17 and the capacitor C14.

When a phase cut signal such as shown in FIG. 14(b) is applied to the inputs 1',2' the voltage on rail RL1 is full wave rectified, with the phase cut preserved, as shown by the solid lines in FIG. 14(c). As previously discussed, the pre-conditioner offset makes the load look purely resistive to input capacitor C4, thereby preserving the phase cut information. Without the pre-conditioner, the capacitor C4 would hold up the input voltage, thereby essentially destroying the phase cut information.

The current through the resistor R1 is proportional to the rectified line voltage on rail RL1. The switch Q6 performs the scaling function. The voltage at the top of resistor R2 is constant at about 4.4 V and is equal to the 5 V supply from the regulator U3 minus the base-emitter voltage "Vbe" across the switch Q6. The current through the voltage divider network of the resistor R4 and the resistor R27 equals the current through the resistor R1 minus the fixed current through the resistor R2. Since the current through the resistor R2 is constant, the voltage at the top of the resistor R4 is scaled but proportional to the rectified line voltage on rail RL1. The voltage divider formed by the resistors R4 and R27 further scales the dim signal, which is applied to the DIM terminal of IC U4 via line 103. The values for the components of the interface circuit are listed in Appendix A. These values are selected for a phase angle dimmer having a conduction angle which varies between 60 and 150 degrees to provide the corresponding dimming signal voltages between 0.3 V and 3 V.

Figure 16A:
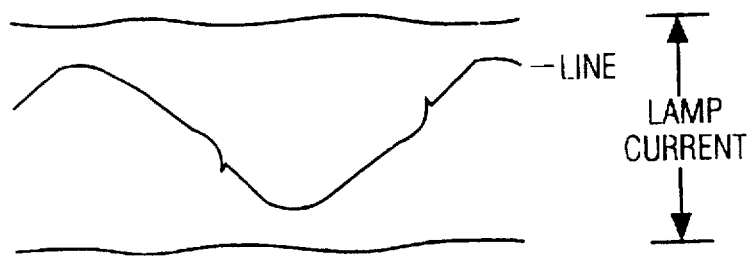
FIGS. 16(a)-16(c) illustrate the lamp current envelope for various conduction angles.
Figure 16B:
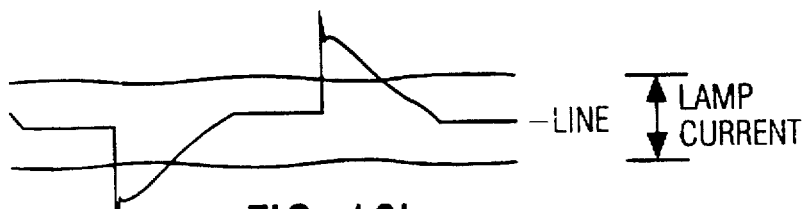
Figure 16C:
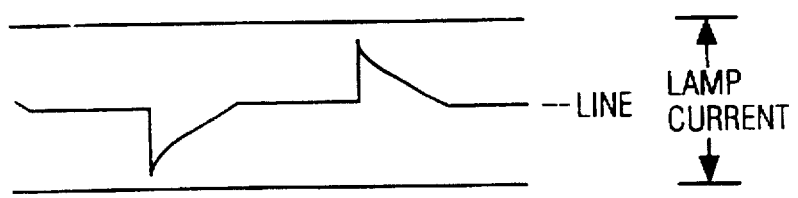

The diode D7 across the resistor R17 discharges the capacitor C14 when power is no longer applied to the input terminals 1', 2', thereby quickly bringing the DIM voltage down. FIGS. 16(a)-16(c) illustrate the resulting high frequency lamp current envelope for no dimming, and two successive dimming levels with increased conduction angle, the lamp current envelope remains substantially constant across the dimming range, and has low ripple. The crest factor for the illustrated lamp current is 1.6.

Appendix A lists the remaining circuit component values.

Figure 17:
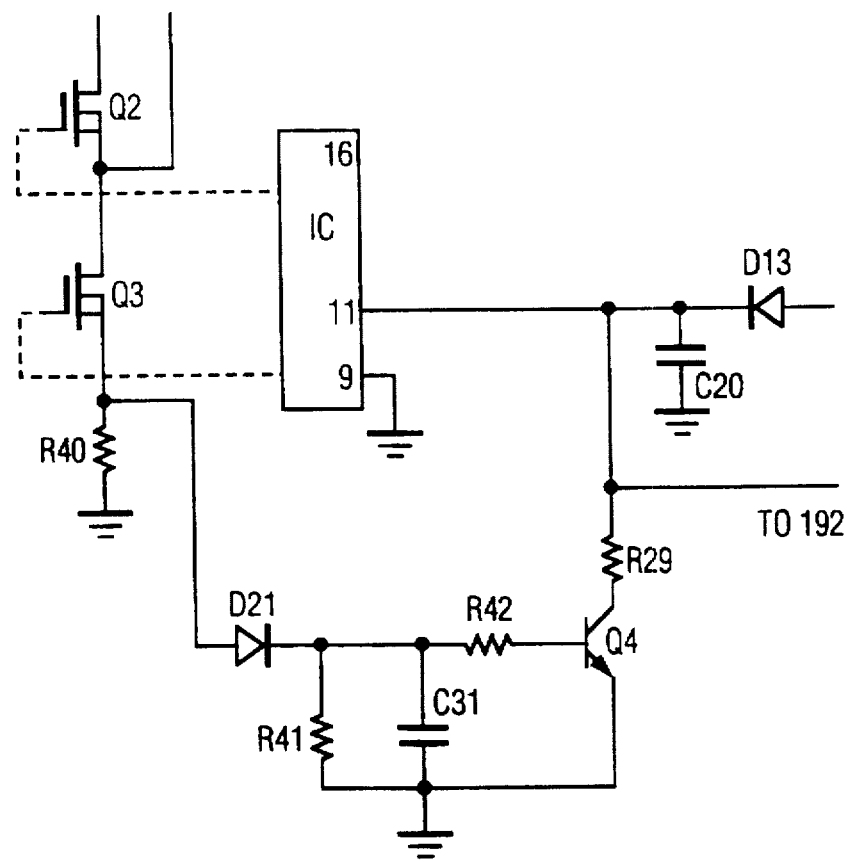
FIG. 17 shows an alternative embodiment of the lamp status detection circuitry for detecting a capacitive mode of operation of the inverter.

FIG. 17 illustrates another embodiment of the safety circuit which, instead of sensing the open circuit lamp voltage via a tap on the primary 184 of transformer T4, directly senses the capacitive mode of operation of the half-bridge which results from failure of or removal of a lamp. It should be noted that this circuit is intended for use with half-bridge controllers, which unlike the described IC U4, does not have internal capacitive mode protection. Elements of the circuit which are the same as that shown in FIG. 6 bear the same reference numerals.

The modified stop circuit includes a resistor R40 connected between the drain of switch Q3 and ground. The base of the switch Q4 is connected to a node between the resistor R40 and the drain of switch Q3 via a diode D21 and a resistor R42. A resistor R41 and a capacitor C31 are connected in parallel between ground and a node between the cathode of the diode D21 and the end of the resistor R42 remote from the base of the switch Q4. The collector of switch Q4 is connected to the high side of the supply capacitor C20 and the VDD supply pin of the IC U4 by a resistor R29, and the emitter of the switch Q4 is connected to ground.

The stop function operates in the following way. During normal operation, the half-bridge operates in the inductive mode, which results in the voltage drop across the resistor R40 being less than a diode drop and the switch Q4 remains in the off (non-conductive) state. If a lamp is removed from its respective terminal, the DC current ceases to flow though the red and blue filaments. This biases the switch Q5 off. At this point, the supply capacitor C20 is still charged by the current from the secondary 155 of the transformer T2. However, removal of the lamp causes the half-bridge to enter the capacitive mode as a result of the Q-curve being shifted by the increased impedance reflected to the primary of T4, which causes a voltage drop of greater than a diode drop. This voltage drop causes turns switch Q4 on through the diode D21 and the resistor R42. The load presented by the switch Q4 to the VDD supply and the capacitor C20 causes the capacitor C20 to discharge through the resistor R29 and the switch Q4 to ground. This places the IC U4 in the standby state, stopping half-bridge oscillation and removing the re-charge current from the secondary 154 of the transformer T2. Additionally, without half-bridge oscillation, there is no output from the transformer T4 and no voltage across the lamp terminals.

Under non-dimming conditions, the disclosed ballast maintains a power factor <0.99, THD <10%, and a crest factor <1.6, so the circuit satisfies both the need for a triac dimmable ballast while also providing a high power factor ballast for non-dimming use. Additionally, the power factor remains high under all but the highest dimming (lowest light) conditions.

While there has been shown to be what are presently considered to be the preferred embodiments of the invention, it will be apparent to those of ordinary skill in the art that various modifications can be made without departing from the scope of the invention as defined by the appended claims. In particular, the various values given for various voltage stop or start levels, and filter impedances are selected for the illustrated implementation and will differ for different lamp applications. Accordingly, the disclosure is illustrative only and not limiting.

APPENDIX A

| | |
|---|---|
| R1 | 110K, ½ W, 1% |
| R2 | 22.0K, ¼ W, 1% |
| R4, R26 | 300K, ¼ W, 1% |
| R5 | 1M, ¼ W, 5% |
| R6 | 6.8K, ¼ W, 5% |
| R7, R32 | 30.1K, ¼ W, 1% |
| R8 | 680K, ¼ W, 5% |
| R9 | Jumper |
| R10 | 10, ¼ W, 6% |
| R11 | 22K, ¼ W, 5% |
| R12 | 330, ¼ W, 5% |
| R13 | 0.22, 1 W, 5% |
| R14 | 809K, ½ W, 1% |
| R15 | 768K, ¼ W, 1% |
| R16 | (used in uF version) |
| R17 | 100K, ¼ W, 5% |
| R18 | 1K, ¼ W, 5% |
| R19 | 5.1K, ¼ W, 1% |
| R20 | 200 Ohm, ¼ W, 1% |
| R21, R22 | 270, ¼ W, 5% |
| R23 | 82K, ½ W, 5% |
| R24 | 13.0K, ¼ W, 1% |
| R25 | 150 Ohm, ¼ W, 5% |
| R27 | 18.0K, ¼ W, 1% |
| R28 | 453K, ¼ W, 1% |
| R29 | 27, ¼ W, 5% |
| R30, R31 | 1.1K, ¼ W, 1% |
| R33 | 420, 2W, 5% |
| R34 | 0.47, 1 W, 5% |
| R35 | 3.3, ¼ W, 1% |
| R36, R37, R38 | 470K, 5%, HV (Philips VR25) |
| C1, C2 | 3900 P, 3 KV, 20% |
| C3 | 0.047 UF, 400 V, 20% |
| C4, C25 | 0.1 UF, 400 V, 20% |
| C5 | 0.22 uF, 100 V, 10% |
| C6, C8 | 0.001 UF, 50 V, 20% |
| C7, C13, C14 | 0.47 UF, 50 V, 10% |
| C10 | 47 UF, 450 V, 20% |
| C11 | used in uP version |
| C12, C30, C17 | 0.1 UF, 50 V, 20% |
| C15 | 0.12 UF, 50 V, 10% |
| C16 | 0.68 UF, 50 V, 10%, X7R |
| C18 | 2200 pF, 100 V, 20% |
| C19 | 62 P, 50 V, 2% |
| C20 | 4.7 UF, 16 V, 20% Elco |
| C21 | 1800 P, 1 KV, 10% |
| C22 | 0.22 uf, 100 V, 20% |
| C23 | 0.0056 UF, 2 KV, 5% |
| C24 | 0.033 UF, 250 V, 5% |
| C26, C28 | 0.33 UF, 50 V, 10% |
| C27 | 0.68 UF, 50 V, 10% |

APPENDIX A-continued

| | |
|---|---|
| C29 | 220 PF, 1 KV, 10% |
| C31 | 88 pF, 3 KV, 10% |
| D1, D2, D3, D4 | BYD, 13G |
| D5, D11, D14, D16 | BYD33J |
| D7, D9, D10, D13, D17 | 1N4148 |
| D8 | 1N52538 (25 V, 5%, ½ W) |
| D12 | 82703 C15 (15 V, 3%, 6 W) |
| D18 | BAX14, 20 V, 2 A, 50 nS; |
| D19, D20 | BZX 79 C43, ½ W, 5%, 43 V |
| Q1, Q2, Q3 | IRF 730 |
| Q4 | PN 2222 |
| Q5 | 2N 3904 |
| Q6 | 2N 5550 |
| V1 | S14K150, 150 V, 10% |
| F1 | 10A, 125 V, PN PICO |
| XL | used in uP version |
| U1 | LX1563 (Linfinity)/TDA4862 (Siemens) |
| U2 | used in uP version |
| U3 | 7BL05 |
| U4 | ALPHA (UB2018A) |
| L1, L2 | N = 196, #29, EE19 BOBBIN E75-26 00RE |
| T1, T2 | 5x #34 Triple, #30 PC40-EF25, 92 MIL GAP |
| T3 | 3T:8T, 0.36 Arms |
| T4 | #30 TRIPLE, #28 TRIPLE 12-PIN BOBBIN, PC40-EF25 |
| R50 | 680K Ohms |
| R51 | 680K Ohms |
| R52 | 30K Ohms |
| R53 | 39K Ohms |
| R54 | 39K Ohms |
| R55 | 100K Ohms |
| R56 | 100K Ohms |
| C52 | 0.1 uF |
| C53 | 0.1 uF |
| C54 | 0.1 uF |
| V3 | −1.85 V |

We claim:

1. A ballast for a gas discharge lamp having at least one electrode extending and defining an electrically conductive path between a pair of lamp contacts, said ballast comprising:

a) input means for receiving a source of electrical energy to power said ballast;

b) ballast means, connected to said input means, for controlling the electrical power supplied to said gas discharge lamp, said ballast means including an isolation transformer coupled to and for electrically isolating a pair of output terminals for connection to the pair of lamp contacts of the gas discharge lamp; and c) safety means including means for detecting the presence of a conductive path between said output terminals, to thereby confirm the presence of the discharge lamp and the continuity of the at least one electrode between the lamp contacts, upon initial application of electrical energy to said input means, said detecting means being coupled to said ballast means such that said ballast means does not energize said gas discharge lamp and provides no electrical potential at said output terminals in the absence of a conductive path between said output terminals upon initial application of electrical energy to said input means.

2. A ballast according to claim 1, wherein said ballast means includes an inverter which oscillates to energize said gas discharge lamp, and said safety means includes means for preventing said inverter from oscillating until there exists a conductive path between said output terminals.

3. A ballast according to claim 2, wherein said input means is receptive of an AC mains voltage and further comprising:

a power supply stage providing a DC voltage to said inverter with a magnitude substantially higher than the peak of the AC mains voltage supplied at said input means, said power supply stage being coupled to said inverter so that said power supply stage is inoperative whenever the inverter is not oscillating.

* * * * *